(12) United States Patent
Jiao et al.

(10) Patent No.: US 12,335,039 B2
(45) Date of Patent: Jun. 17, 2025

(54) DATA RETRANSMISSION METHOD AND RELATED APPARATUS

(71) Applicant: Huawei Technologies Co., Ltd., Shenzhen (CN)

(72) Inventors: Shurong Jiao, Shanghai (CN); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 739 days.

(21) Appl. No.: 17/653,485

(22) Filed: Mar. 4, 2022

(65) Prior Publication Data

US 2022/0190961 A1 Jun. 16, 2022

Related U.S. Application Data

(63) Continuation of application No. PCT/CN2019/104678, filed on Sep. 6, 2019.

(51) Int. Cl.
*H04L 1/08* (2006.01)
*H04W 72/12* (2023.01)

(52) U.S. Cl.
CPC ............... *H04L 1/08* (2013.01); *H04W 72/12* (2013.01)

(58) Field of Classification Search
CPC .................. H04L 1/08; H04W 72/12
See application file for complete search history.

(56) References Cited

U.S. PATENT DOCUMENTS

2019/0053211 A1  2/2019  Ying et al.
2019/0261354 A1  8/2019  Fakoorian et al.
(Continued)

FOREIGN PATENT DOCUMENTS

CN  101989901 A  3/2011
CN  107733582 A  2/2018
CN  108400845 A  8/2018
(Continued)

OTHER PUBLICATIONS

NTT DOCOMO, Inc., "PUSCH enhancements for URLLC", 3GPP TSG RAN WG1 #97, R1-1906213, Reno, NV, USA, May 13-17, 2019, 4 pages.
(Continued)

*Primary Examiner* — Kent Krueger
(74) *Attorney, Agent, or Firm* — Slater Matsil, LLP

(57) ABSTRACT

A radio access network device configures a first parameter and location indication information for a first terminal device. The first parameter is used to determine a data transmission resource of the first terminal device. The location indication information indicates a location of first retransmission scheduling information corresponding to the first terminal device in retransmission scheduling information. Then, the first terminal device sends uplink data to the radio access network device, and the radio access network device receives the uplink data. Afterwards, the radio access network device sends the retransmission scheduling information to the first terminal device. The first terminal device determines a retransmission resource based on the retransmission scheduling information, the location indication information, and the first parameter. Finally, the first terminal device retransmits the uplink data to the radio access network device by using the retransmission resource.

20 Claims, 8 Drawing Sheets

(56) References Cited

U.S. PATENT DOCUMENTS

2020/0008222 A1\* 1/2020 Cao .................. H04L 5/0051
2020/0344810 A1\* 10/2020 Xiong ............... H04W 74/0833

FOREIGN PATENT DOCUMENTS

| CN | 108633070 A | 10/2018 |
| CN | 110035519 A | 7/2019 |
| WO | 2018127201 A1 | 7/2018 |

OTHER PUBLICATIONS

CATT, "Consideration on multi-TRP/panel transmission", 3GPP TSG RAN WG1 Ad-Hoc Meeting 1901, R1-1900339, Taipei, TW, Jan. 21-25, 2019, 14 pages.

Mediatek Inc., "RRC parameters for retransmission of a grant-free", 3GPP TSG RAN WG1 Meeting #94bis, R1-1810431, Oct. 8-12, 2018, 2 pages, Chengdu, China.

Qualcomm Inc., "Enhancements to Scheduling and HARQ for eURLLC", 3GPP TSG-RAN WG1 #96b, R1-1905022, Xi'an, China, Apr. 8-12, 2019, 6 pages.

3GPP TS 38.214 V15.6.0 (Jun. 2019), 3rd Generation Partnership Project; Technical Specification Group Radio Access Network; NR; Physical layer procedures for data (Release 15), 105 pages.

3GPP TS 38.331 V15.6.0 (Jun. 2019), 3rd Generation Partnership Project; Technical Specification Group Radio Access Network; NR; Radio Resource Control (RRC) protocol specification (Release 15), 519 pages.

\* cited by examiner

DATA RETRANSMISSION METHOD AND RELATED APPARATUS

CROSS-REFERENCE TO RELATED APPLICATIONS

This application is a continuation of International Application No. PCT/CN2019/104678, filed on Sep. 6, 2019, the disclosure of which is hereby incorporated by reference in its entirety.

TECHNICAL FIELD

This application relates to the communications field, and in particular, to a data retransmission method and a related apparatus.

BACKGROUND

A mobile communications system includes a core network device, a radio access network device, and at least one terminal device. The radio access network device is a network-side entity configured to transmit or receive a signal, for example, a base station (also referred to as a NodeB (NB), an evolved NodeB (eNB), or a next-generation NodeB (gNB)). The terminal device is a user-side entity configured to receive or transmit a signal, for example, a mobile phone. When data exchange is performed between the radio access network device and the terminal device, the radio access network device needs to schedule the terminal device.

Uplink data transmission is used as an example. A hybrid automatic repeat request (HARQ) process indicates a process in which the terminal device sends an uplink data packet (sent after scheduling performed by the base station or independently sent by a user) and retransmits the data packet (optional) until the base station correctly receives the data packet. As shown in FIG. 1, when the terminal device transmits data to the base station, there are two data transmission processes. In a scenario shown in FIG. 1, the data transmission processes are sorted in order in a sending process and a receiving process, that is, first sent first received. In an actual case, for different processes, an order of data transmission, retransmission scheduling, and data retransmission may be disrupted. FIG. 2 is used as an example. In initial transmission, a data transmission process 1 is before a data transmission process 2. However, in retransmission scheduling and data retransmission, the data transmission process 1 is after the data transmission process 2. In this way, order disruption allows the base station to flexibly implement scheduling. To ensure that the data transmission process 1 is not confused with the data transmission process 2 when the terminal device receives retransmission scheduling and when the base station receives the uplink data, a process number of each time of transmission may be specified. For dynamic uplink scheduling, the base station adds the process number to downlink control information (DCI) for uplink data scheduling, and the terminal device determines a specific process corresponding to this time of scheduling to perform correct data transmission/retransmission.

However, retransmission performed on a configured grant physical uplink shared channel is dynamically scheduled by the base station through delivering a physical downlink control channel (PDCCH). For a service scenario of a small data packet and large user density, retransmission of each terminal device is scheduled by the base station through delivering a PDCCH. In this case, overheads of downlink control information are large, thereby affecting a network capacity.

SUMMARY

Embodiments of this application provide a data retransmission method and a related apparatus, to reduce downlink control overheads of retransmission scheduling.

According to a first aspect, an embodiment of this application provides a data retransmission method, applied to a communications network including a radio access network device and a terminal device. The terminal device and the radio access network device are in a data exchange scenario of a small data packet and large data density. The radio access network device configures a first parameter and location indication information for a first terminal device. The first parameter is used to determine a data transmission resource of the first terminal device. The location indication information is used to indicate a location of first retransmission scheduling information corresponding to the first terminal device in retransmission scheduling information. Then, the first terminal device sends uplink data to the radio access network device, and the radio access network device receives the uplink data. Afterwards, the radio access network device sends the retransmission scheduling information to the first terminal device. The first terminal device determines a retransmission resource based on the retransmission scheduling information, the location indication information, and the first parameter. Finally, the first terminal device retransmits the uplink data to the radio access network device by using the retransmission resource.

In this embodiment, it may be understood that the first parameter is used to configure a plurality of data transmission resources, and one configuration identifier is configured for each data transmission resource. For example, four data transmission resources are configured by using the first parameter, and configuration identifiers of the four data transmission resources may be respectively 1, 2, 3, and 4. The location indication information may be used to indicate the location of the first retransmission scheduling information corresponding to the first terminal device in the retransmission scheduling information. For example, if the radio access network device configures that the first retransmission scheduling information corresponding to the first terminal device is located in a third segment of the retransmission scheduling information, the first terminal device may directly read the third segment of information in the retransmission scheduling information after receiving the retransmission scheduling information, to obtain the first retransmission scheduling information.

In this embodiment, the radio access network device preconfigures a plurality of data transmission resources for the first terminal device. The first retransmission scheduling information that is configured by the radio access network device for the first terminal device is included in the retransmission scheduling information sent by the radio access network device. Retransmission scheduling information of another terminal device may be further configured in the retransmission scheduling information. In this way, the radio access network device can schedule a plurality of terminal devices through sending the retransmission scheduling information for one time, to reduce downlink control overheads of retransmission scheduling.

Optionally, a specific configuration manner of the retransmission scheduling information is as follows: The retransmission scheduling information uses N bits to indicate a retransmission resource of a data transmission process corresponding to the first terminal device. Herein, N is a positive integer. In addition, when the first terminal device exchanges data with the radio access network device, the radio access network device indicates, to the first terminal device, a specific data process to which the retransmission resource is used. Therefore, the retransmission scheduling information indicates the data transmission process of the first terminal device. The retransmission resource is included in a data transmission resource indicated by using the first parameter.

Based on the foregoing method, the retransmission scheduling information indicates the data transmission process of the first terminal device. Details are as follows:

In an example, if the first terminal device corresponds to X data transmission processes, the retransmission scheduling information uses X groups of N bits to indicate retransmission resources corresponding to the X data transmission processes of the first terminal device. The X groups of N bits are sorted in order based on process identifiers of the X data transmission processes, so that the first terminal device can sequentially obtain a retransmission resource corresponding to a data transmission process. Herein, X is a positive integer. For example, the first terminal device corresponds to three data transmission processes, and process identifiers of the three data transmission processes are respectively 11, 22, and 33. In this case, the radio access network device configures three N bits at corresponding locations of the retransmission scheduling information for the first terminal device. In an example, a location order of the three N bits is as follows: N bits used to indicate the retransmission resource for the data transmission process 11 rank first, N bits used to indicate the retransmission resource for the data transmission process 22 rank second, and N bits used to indicate the retransmission resource for the data transmission process 33 rank third. The three N bits may be consecutively sorted, or may be inconsecutively sorted. The specific sorting order may be set by the radio access network device, provided that the radio access network device and the first terminal device both agree on the order and the first terminal device can obtain the corresponding retransmission resource.

In another example, if the first terminal device corresponds to X data transmission processes, the retransmission scheduling information uses Y bits to indicate a process identifier of a data transmission process corresponding to the first terminal device, and uses N bits to indicate a retransmission resource of the data transmission process corresponding to the first terminal device. For example, if process identifiers of data transmission processes corresponding to the first terminal device are respectively 1, 2, and 3, two bits may be used to indicate the process identifier. For example, 00 represents a data transmission process whose process identifier is 1, 01 represents a data transmission process whose process identifier is 2, and 10 represents a data transmission process whose process identifier is 3.

In another example, the retransmission scheduling information uses a parameter of downlink control information to indicate a process identifier of a data transmission process corresponding to the first terminal device. The parameter of the downlink control information is a search space set configuration, a radio network temporary identifier (RNTI), or a scrambling code corresponding to a downlink control channel. The retransmission scheduling information is included in the downlink control information. For example, process identifiers of data transmission processes corresponding to the first terminal device are respectively 1, 2, and 3, and four search space set configurations corresponding to downlink control channels are respectively configurations 1, 2, 3, and 4. Data retransmission scheduling corresponding to the process identifier 1 may be performed by using the retransmission scheduling information that is carried on a downlink control channel received on a physical resource corresponding to the search space set configuration 1. Data retransmission scheduling corresponding to the process identifier 2 is performed by using the retransmission scheduling information that is carried on a downlink control channel received on a physical resource corresponding to the search space set configuration 3. Data retransmission scheduling corresponding to the process identifier 3 is performed by using the retransmission scheduling information that is carried on downlink control channels received on physical resources corresponding to the search space set configurations 2 and 4. For another example, process identifiers of data transmission processes corresponding to the first terminal device are respectively 1 and 2, and radio network temporary identifiers corresponding to the first terminal device include an identifier a and an identifier b. Data retransmission scheduling corresponding to the process identifier 1 is performed by using retransmission scheduling information that is masked by using the identifier a and that is carried on a downlink control channel. Data retransmission scheduling corresponding to the process identifier 2 is performed by using retransmission scheduling information that is marked by using the identifier b and that is carried on a downlink control channel. For another example, scrambling codes for data transmission corresponding to the first terminal device are respectively 1 and 2. The scrambling codes corresponding to the first terminal device include a scrambling code a and a scrambling code b. The data retransmission scheduling corresponding to the process identifier 1 is performed by using retransmission scheduling information that is scrambled by using the scrambling code a and that is carried on a downlink control channel. The data retransmission scheduling corresponding to the process identifier 2 is performed by using retransmission scheduling information that is scrambled by using the identifier b and that is carried on a downlink control channel.

Further, if there are M data transmission resources at a window location for sending downlink control information for two consecutive times by the radio access network device, data retransmission is allowed for Z data transmission processes. If Z is less than or equal to M, the retransmission scheduling information indicates the X data transmission processes. Herein, X is equal to Z. In other words, when the retransmission scheduling information indicates the data transmission process of the first terminal device, if a quantity of data transmission resources included in a window is greater than or equal to a quantity of data transmission processes of the first terminal device, one piece of retransmission scheduling information may indicate only Z data transmission processes. A data transmission process may be directly selected according to an order of process identifiers, or may be selected based on a priority of data transmission. A specific implementation is not limited herein. If Z is greater than M, the retransmission scheduling information indicates the X data transmission processes. Herein, X is equal to Z, or X is equal to M. In other words, when the quantity of allowed data transmission processes is greater than the quantity of data transmission resources included in the window, and the retransmission scheduling information indicates the data transmission process of the first terminal device, one piece of retransmission scheduling information may indicate Z data transmission processes, or may indicate the data transmission processes based on the M included data transmission resources. A data transmission process may be directly selected according to an order of process identifiers, or may be selected based on a priority of data transmission. A specific implementation is not limited herein.

In the foregoing several manners, the retransmission scheduling information is configured to include a plurality of pieces of retransmission scheduling information of a terminal device or retransmission scheduling information of a plurality of terminal devices, to effectively reduce downlink overheads.

Based on the retransmission scheduling information, that the first terminal device determines a retransmission resource based on the retransmission scheduling information, the location indication information, and the first parameter specifically includes that the first terminal device determines, based on the location indication information, the first retransmission scheduling information included in the retransmission scheduling information; and then the first terminal device determines the retransmission resource based on the first retransmission scheduling information and the first parameter.

In this embodiment, if there is a second terminal device, the radio access network device also configures a parameter for the second terminal device. The parameter is used to indicate a data transmission resource of the second terminal device. Therefore, when the retransmission scheduling information includes second retransmission scheduling information of the second terminal device, the second retransmission scheduling information may also be configured by using the same configuration method as the first retransmission scheduling information, and the second retransmission scheduling information is added to the retransmission scheduling information. In this way, the first terminal device may directly read the first retransmission scheduling information to obtain the retransmission resource of the first terminal device, and the second terminal device may directly read the second retransmission scheduling information to obtain the retransmission resource of the second terminal device. In this way, the retransmission resources of the two terminal devices are not limited by each other.

Optionally, in a possible implementation, the radio access network device configures the first parameter for the first terminal device and the second terminal device, and the first parameter is used to determine the data transmission resource of the first terminal device and the data transmission resource of the second terminal device. When the retransmission scheduling information includes the first retransmission scheduling information of the first terminal device and the second retransmission scheduling information of the second terminal device, the radio access network device configures the retransmission scheduling information to include S segments. Each segment includes Q bits. An $i^{th}$ segment of Q bits is used to indicate whether to perform data retransmission for a data transmission process of a terminal device j (that is, each segment of Q bits is used to indicate whether to perform data retransmission for a data transmission process of a terminal device). A retransmission resource of the data transmission process of the terminal device j is determined based on retransmission scheduling information indicated by using a first segment to an $(i-1)^{th}$ segment of Q bits. A value of S is equal to a quantity of data transmission resources indicated by using the first parameter. Herein, S is a positive integer. The retransmission scheduling information indicates a data transmission process of a terminal device. Herein, i is not greater than S, j is not greater than S, and i and j are positive integers. Optionally, the radio access network device sorts the S segments of Q bits based on values of identifiers of different corresponding terminal devices and different process identifiers. For a terminal device, corresponding Q bits may be learned based on a sorting location at which the terminal device is located. For ease of understanding, it is assumed herein that the retransmission scheduling information includes four segments, each segment is two bits, a terminal device 1 has only two data transmission processes, a terminal device 2 has only one data transmission process, a terminal device 3 has only one data transmission process, and identifiers of the three terminal devices are in ascending order. In this case, a first segment of two bits corresponds to a first data transmission process of the terminal device 1, a second segment of two bits corresponds to a second data transmission process of the terminal device 1, a third segment of two bits corresponds to a data transmission process of the terminal device 2, and a fourth segment of two bits corresponds to a data transmission process of the terminal device 3. The terminal device 1 may learn, based on the first segment of two bits and the second segment of two bits in the retransmission scheduling information, whether to perform data retransmission for the two data transmission processes of the terminal device 1. The terminal device 2 learns, based on the third segment of two bits, whether to perform data retransmission for the data transmission process of the terminal device 2. The terminal device 3 learns, based on the fourth segment of two bits, whether to perform data retransmission for the data transmission process of the terminal device 3.

Specifically, a configuration manner of the retransmission scheduling information may be as follows:

In an example, if Q is equal to 1, the retransmission scheduling information uses the $i^{th}$ segment of Q bits to indicate whether to perform data retransmission for the data transmission process of the terminal device j; or if Q is greater than 1, the retransmission scheduling information uses Q−1 bits in the $i^{th}$ segment of Q bits to indicate a process identifier of the data transmission process corresponding to the terminal device j, and uses one bit in the $i^{th}$ segment of Q bits to indicate whether to perform data retransmission for the data transmission process corresponding to the terminal device j.

Based on the foregoing method, if the terminal device j has P data transmission processes, the S segments of the retransmission scheduling information include R segments of Q bits. Herein, R is not greater than S, R is a positive integer, and P is a positive integer. If R is equal to 1, the retransmission scheduling information indicates a data transmission process corresponding to the terminal device j. In this case, when Q is equal to 1, another configuration parameter is used to indicate a process identifier corresponding to the data transmission process. When Q is greater than 1, Q−1 bits may be used to indicate a process identifier of the data transmission process corresponding to the segment of Q bits. Alternatively, if R is greater than 1 and less than P, each segment of Q bits in the R segments of Q bits indicated by using the retransmission scheduling information indicates one data transmission process corresponding to the terminal device j, that is, the R segments of Q bits in the retransmission scheduling information indicate R data transmission processes of the terminal device j. In this case, when Q is equal to 1, another configuration parameter is used to indicate a correspondence between each segment of Q bits in the R segments of Q bits and a data transmission process corresponding to the terminal device j. For example, in the R segments of Q bits, a first segment of Q bit indicates a data transmission process 1 of the terminal device j, and a second segment of Q bit indicates a data transmission process 3 of the terminal device j. When Q is greater than 1, Q−1 bits in each segment in the R segments may be used to indicate a process identifier of a data transmission process. Alternatively, if R is equal to P, the R segments of Q bits in the retransmission scheduling information are sorted in order based on process identifiers of the data transmission processes corresponding to the first terminal device. In other words, the current retransmission scheduling information indicates all the data transmission processes corresponding to the terminal device j. In this case, when Q is equal to 1, segments of Q bits are sorted in order based on the process identifiers of the data transmission processes corresponding to the terminal device j. For example, if the process identifiers of the data transmission processes corresponding to the first terminal device are 1, 2, 3, and 4, a first segment of Q bits corresponds to a data transmission process of the process identifier 1, a second segment of Q bits corresponds to a data transmission process of the process identifier 2, a third segment of Q bits corresponds to a data transmission process of the process identifier 3, and a fourth segment of Q bits corresponds to a data transmission process of the process identifier 4. When Q is greater than 1, Q−1 bits in each segment in the R segments may be used to indicate a process identifier of a data transmission process corresponding to this segment of Q bits.

Based on the foregoing configuration manner of the retransmission scheduling information, that the first terminal device determines a retransmission resource based on the retransmission scheduling information, the location indication information, and the first parameter specifically includes that the first terminal device determines the first retransmission scheduling information in the retransmission scheduling information based on the location indication information, and determines based on the first retransmission scheduling information whether to perform data retransmission for each data transmission process of the first terminal device; and finally, the first terminal device reads the second retransmission scheduling information and the first parameter to determine the retransmission resource of each data transmission process of the first terminal device. For example, the retransmission scheduling information is divided into 10 segments. In this case, a first segment corresponds to a data transmission resource whose configuration identifier is 1 and that is determined by using the first parameter, a second segment corresponds to a data transmission resource whose configuration identifier is 2 and that is determined by using the first parameter, and so on. A first data transmission process of the first terminal device (referred to as an A process 1) is located in a third segment of the retransmission scheduling information sent by the radio access network device, and a second data transmission process of the first terminal device (referred to as an A process 2) is located in a fourth segment of the radio access network device. A first data transmission process of the second terminal device (referred to as a B process 1) is located in a first segment of the retransmission scheduling information sent by the radio access network device, and a second data transmission process of the second terminal device (referred to as a B process 2) is located in a second segment of the retransmission scheduling information sent by the radio access network device. Information in the first segment indicates "performing retransmission for the B process 1". Information in the second segment indicates "skipping retransmission for the B process 2". Information in the third segment indicates "performing retransmission for the A process 1". Information in the fourth segment indicates "skipping retransmission for the A process 2". In this case, data retransmission is performed for the first data transmission process of the second terminal device by using the data transmission resource whose configuration identifier is 1, and data retransmission is performed for the first data transmission process of the first terminal device by using the data transmission resource whose configuration identifier is 2. If the retransmission scheduling information further includes retransmission scheduling information of a third terminal device, a first data transmission process of the third terminal device is located in a fifth segment of the retransmission scheduling information. If information in the fifth segment indicates "performing retransmission for a C process 1", data retransmission is performed for the first data transmission process of the third terminal device by using a data transmission resource whose configuration identifier is 3.

Optionally, the foregoing describes configuration of the retransmission scheduling information and how the terminal device reads the retransmission scheduling information. The following describes the first parameter in this embodiment.

In an example, the first parameter is configured based on parameters of a configured grant physical uplink shared channel configured grant PUSCH. A second parameter is used to indicate that a data transmission resource indicated by using the first parameter is used for initial transmission and/or retransmission. The second parameter is included in the parameters of the configured grant PUSCH. It may be understood that the second parameter may be a newly added parameter, and the newly added parameter is included in the parameters of the configured grant PUSCH; or the second parameter may be a parameter of the configured grant PUSCH. In this way, the data transmission resource used for retransmission and the data transmission resource used for initial transmission are configured in the same manner, to effectively save configuration resources. In addition, use of data transmission resources can be effectively distinguished, to effectively use the data transmission resources.

In an example, the radio access network device uses first dedicated radio resource control signaling to configure a data transmission resource that is used for initial transmission and that is indicated by using the first parameter, and uses second dedicated radio resource control signaling to configure a data transmission resource that is used for retransmission and that is indicated by using the first parameter. In this way, the data transmission resource used for retransmission and the data transmission resource used for initial transmission are separately indicated, to effectively distinguish between use of the data transmission resources and effectively use the data transmission resources. In this solution, a quantity of parameter types that are used to configure a data transmission resource used for retransmission in the first parameter is less than a quantity of parameter types that are used to configure a data transmission resource used for initial transmission in the first parameter. For example, an initial transmission resource configuration parameter includes time domain resource location information, frequency domain resource location information, a quantity of transmission repetition times, a quantity of processes, a waveform parameter, a power control parameter, and the like; and a retransmission resource configuration parameter may include only one or more of time domain resource location information, frequency domain resource location information, or a quantity of transmission repetition times, and does not include a quantity of processes, a waveform parameter, and a power control parameter.

In an example, the first parameter is configured by using parameters of a configured grant PUSCH. A preset mapping relationship is met between a data transmission resource that is used for initial transmission and that is indicated by using the first parameter and a data transmission resource that is used for retransmission and that is indicated by using the first parameter. In this solution, the preset mapping relationship indicates that the data transmission resource that is used for initial transmission and that is indicated by using the first parameter and the data transmission resource that is used for retransmission and that is indicated by using the first parameter are data transmission resources corresponding to the same data transmission process and configuration parameters corresponding to the same configuration identifier. The configuration identifier is used to identify each data transmission resource of the first parameter. Alternatively, the preset mapping relationship indicates that the data transmission resource that is used for initial transmission and that is indicated by using the first parameter and the data transmission resource that is used for retransmission and that is indicated by using the first parameter are data transmission resources corresponding to the same data transmission process and configuration parameters corresponding to different configuration identifiers. A preset offset relationship exists between a configuration identifier of the data transmission resource that is used for initial transmission and that is indicated by using the first parameter and a configuration identifier of the data transmission resource that is used for retransmission and that is indicated by using the first parameter.

Based on the foregoing solution, the second parameter may be a newly added parameter. The newly added parameter is included in the parameters of the configured grant PUSCH. In this case, the second parameter is an explicit parameter. If the second parameter is a ternary parameter, different values of the second parameter may indicate different use statuses of a data transmission resource. For example, the radio access network device configures the second parameter to indicate that the data transmission resource is used for initial transmission; or the radio access network device configures the second parameter to indicate that the data transmission resource is used for retransmission; or the radio access network device configures the second parameter to indicate that the data transmission resource is used for initial transmission and retransmission (that is, the data transmission resource can be used for both initial transmission and retransmission). If the second parameter is a binary parameter, the radio access network device indicates the use status of the data transmission resource through configuring a value for the second parameter or not configuring a value for the second parameter. For example, when the radio access network device configures a value for the second parameter, the radio access network device configures the second parameter to indicate that the data transmission resource is used for initial transmission; or the radio access network device configures the second parameter to indicate that the data transmission resource is used for retransmission; or when the radio access network device does not configure the second parameter to indicate that the data transmission resource is used for initial transmission and retransmission (that is, the data transmission resource can be used for both initial transmission and retransmission).

Optionally, the second parameter is a parameter of the configured grant PUSCH. The radio access network device configures a value of the second parameter. The value is used to indicate that the data transmission resource indicated by using the first parameter is used for initial transmission or retransmission. In this solution, in an example, the second parameter is a modulation and coding scheme and a transport block size. When a value corresponding to the modulation and coding scheme and the transport block size is from 0 to 27, it indicates initial transmission, or when a value corresponding to the modulation and coding scheme and the transport block size is from 28 to 31, it indicates retransmission. Alternatively, when a value corresponding to the modulation and coding scheme and the transport block size is from 0 to 28, it indicates initial transmission, or when a value corresponding to the modulation and coding scheme and the transport block size is from 29 to 31, it indicates retransmission. In an example, in initial transmission, when an index of the modulation and coding scheme is a value from 0 to 28, the terminal device may determine a modulation scheme and a bit rate in a current time of data transmission based on the value, and then determine a transport block size with reference to time-frequency resource information (provided by another parameter) allocated for this time of data transmission. In retransmission, a transport block used for data transmission remains unchanged. Therefore, the transport block size remains unchanged. The terminal device needs to obtain only modulation scheme information based on an index value corresponding to the modulation and coding scheme and the transport block size. Therefore, the value corresponding to the modulation and coding scheme and the transport block size in retransmission is a value from 29 to 31. In addition, in this example, a modulation scheme supported between the radio access network device and the terminal device is quadrature phase shift keying (QPSK), 16 quadrature amplitude modulation (16QAM), and 64 quadrature amplitude modulation (64QAM). Therefore, in retransmission, the value corresponding to the modulation and coding scheme and the transport block size is from 29 to 31. When four modulation schemes (for example, QPSK, 16QAM, 64QAM, and 256 quadrature amplitude modulation (256QAM)) are supported between the radio access network device and the terminal device, in retransmission, the value corresponding to the modulation and coding scheme and the transport block size is from 28 to 31.

In an example, the second parameter is a modulation and coding group. When the modulation and coding group is a non-low bit rate group, it indicates initial transmission, or when the modulation and coding group is a low bit rate group, it indicates retransmission.

In an example, the second parameter is a quantity of repetition times. When the quantity of repetition times is less than a preset threshold, it indicates initial transmission, or when the quantity of repetition times is greater than or equal to a preset threshold, it indicates retransmission. Alternatively, when the quantity of repetition times is less than or equal to a preset threshold, it indicates initial transmission, or when the quantity of repetition times is greater than a preset threshold, it indicates retransmission.

According to a second aspect, an embodiment of this application provides a data retransmission method, applied to a communications network including a radio access network device and a terminal device. The terminal device and the radio access network device are in a data exchange scenario of a small data packet and large data density. The radio access network device configures a first parameter and location indication information for a first terminal device. The first parameter is used to determine a data transmission resource of the first terminal device. The location indication information is used to indicate a location of first retransmission scheduling information corresponding to the first terminal device in retransmission scheduling information. Then, the first terminal device sends uplink data to the radio access network device, and the radio access network device receives the uplink data. Afterwards, the radio access network device sends the retransmission scheduling information to the first terminal device. The first terminal device determines a retransmission resource based on the retransmission scheduling information, the location indication information, and the first parameter. Finally, the first terminal device retransmits the uplink data to the radio access network device by using the retransmission resource.

In this embodiment, it may be understood that the first parameter is used to configure a plurality of data transmission resources, and one configuration identifier is configured for each data transmission resource. For example, four data transmission resources are configured by using the first parameter, and configuration identifiers of the four data transmission resources may be respectively 1, 2, 3, and 4. The location indication information may be used to indicate the location of the first retransmission scheduling information corresponding to the first terminal device in the retransmission scheduling information. For example, if the radio access network device configures that the first retransmission scheduling information corresponding to the first terminal device is located in a third segment of the retransmission scheduling information, the first terminal device may directly read the third segment of information in the retransmission scheduling information after receiving the retransmission scheduling information, to obtain the first retransmission scheduling information.

In this embodiment, the radio access network device preconfigures a plurality of data transmission resources for the first terminal device. The first retransmission scheduling information that is configured by the radio access network device for the first terminal device is included in the retransmission scheduling information sent by the radio access network device. Retransmission scheduling information of another terminal device may be further configured in the retransmission scheduling information. In this way, the radio access network device can schedule a plurality of terminal devices through sending the retransmission scheduling information for one time, to reduce downlink control overheads of retransmission scheduling.

Optionally, a specific configuration manner of the retransmission scheduling information is as follows: The retransmission scheduling information uses N bits to indicate a retransmission resource of a data transmission process corresponding to the first terminal device. Herein, N is a positive integer. In addition, when the first terminal device exchanges data with the radio access network device, the radio access network device indicates, to the first terminal device, a specific data process to which the retransmission resource is used. Therefore, the retransmission scheduling information indicates the data transmission process of the first terminal device. The retransmission resource is included in a data transmission resource indicated by using the first parameter.

Based on the foregoing method, the retransmission scheduling information indicates the data transmission process of the first terminal device. Details are as follows:

In an example, if the first terminal device corresponds to X data transmission processes, the retransmission scheduling information uses X groups of N bits to indicate retransmission resources corresponding to the X data transmission processes of the first terminal device. The X groups of N bits are sorted in order based on process identifiers of the X data transmission processes, so that the first terminal device can sequentially obtain a retransmission resource corresponding to a data transmission process. Herein, X is a positive integer. For example, the first terminal device corresponds to three data transmission processes, and process identifiers of the three data transmission processes are respectively 11, 22, and 33. In this case, the radio access network device configures three N bits at corresponding locations of the retransmission scheduling information for the first terminal device. In an example, a location order of the three N bits is as follows: N bits used to indicate the retransmission resource for the data transmission process 11 rank first, N bits used to indicate the retransmission resource for the data transmission process 22 rank second, and N bits used to indicate the retransmission resource for the data transmission process 33 rank third. The three N bits may be consecutively sorted, or may be inconsecutively sorted. The specific sorting order may be set by the radio access network device, provided that the radio access network device and the first terminal device both agree on the order and the first terminal device can obtain the corresponding retransmission resource.

In another example, if the first terminal device corresponds to X data transmission processes, the retransmission scheduling information uses Y bits to indicate a process identifier of a data transmission process corresponding to the first terminal device, and uses N bits to indicate a retransmission resource of the data transmission process corresponding to the first terminal device. For example, if process identifiers of data transmission processes corresponding to the first terminal device are respectively 1, 2, and 3, two bits may be used to indicate the process identifier. For example, 00 represents a data transmission process whose process identifier is 1, 01 represents a data transmission process whose process identifier is 2, and 10 represents a data transmission process whose process identifier is 3.

In another example, the retransmission scheduling information uses a parameter of downlink control information to indicate a process identifier of a data transmission process corresponding to the first terminal device. The parameter of the downlink control information is a search space configuration, a radio network temporary identifier (RNTI), or a scrambling code corresponding to a downlink control channel. The retransmission scheduling information is included in the downlink control information. For example, process identifiers of data transmission processes corresponding to the first terminal device are respectively 1, 2, and 3, and four search space set configurations corresponding to downlink control channels are respectively configurations 1, 2, 3, and 4. Data retransmission scheduling corresponding to the process identifier 1 may be performed by using the retransmission scheduling information that is carried on a downlink control channel received on a physical resource corresponding to the search space set configuration 1. Data retransmission scheduling corresponding to the process identifier 2 is performed by using the retransmission scheduling information that is carried on a downlink control channel received on a physical resource corresponding to the search space set configuration 3. Data retransmission scheduling corresponding to the process identifier 3 is performed by using the retransmission scheduling information that is carried on downlink control channels received on physical resources corresponding to the search space set configurations 2 and 4. For another example, process identifiers of data transmission processes corresponding to the first terminal device are respectively 1 and 2, and radio network temporary identifiers corresponding to the first terminal device include an identifier a and an identifier b. Data retransmission scheduling corresponding to the process identifier 1 is performed by using retransmission scheduling information that is masked by using the identifier a and that is carried on a downlink control channel. Data retransmission scheduling corresponding to the process identifier 2 is performed by using retransmission scheduling information that is marked by using the identifier b and that is carried on a downlink control channel. For another example, scrambling codes for data transmission corresponding to the first terminal device are respectively 1 and 2. The scrambling codes corresponding to the first terminal device include a scrambling code a and a scrambling code b. The data retransmission scheduling corresponding to the process identifier 1 is performed by using retransmission scheduling information that is scrambled by using the scrambling code a and that is carried on a downlink control channel. The data retransmission scheduling corresponding to the process identifier 2 is performed by using retransmission scheduling information that is scrambled by using the identifier b and that is carried on a downlink control channel.

Further, if there are M data transmission resources at a window location for sending downlink control information for two consecutive times by the radio access network device, data retransmission is allowed for Z data transmission processes. If Z is less than or equal to M, the retransmission scheduling information indicates the X data transmission processes. Herein, X is equal to Z. In other words, when the retransmission scheduling information indicates the data transmission process of the first terminal device, if a quantity of data transmission resources included in a window is greater than or equal to a quantity Z of data transmission processes of the first terminal device, one piece of retransmission scheduling information may indicate only Z data transmission processes. A data transmission process may be directly selected according to an order of process identifiers, or may be selected based on a priority of data transmission. A specific implementation is not limited herein. If Z is greater than M, the retransmission scheduling information indicates the X data transmission processes. Herein, X is equal to Z, or X is equal to M. In other words, when the quantity of allowed data transmission processes is greater than the quantity of data transmission resources included in the window, and the retransmission scheduling information indicates the data transmission process of the first terminal device, one piece of retransmission scheduling information may indicate Z data transmission processes, or may indicate the data transmission processes based on the M included data transmission resources. A data transmission process may be directly selected according to an order of process identifiers, or may be selected based on a priority of data transmission. A specific implementation is not limited herein.

In the foregoing several manners, the retransmission scheduling information is configured to include a plurality of pieces of retransmission scheduling information of a terminal device or retransmission scheduling information of a plurality of terminal devices, to effectively reduce downlink overheads.

In this embodiment, if there is a second terminal device, the radio access network device also configures a parameter for the second terminal device. The parameter is used to indicate a data transmission resource of the second terminal device. Therefore, when the retransmission scheduling information includes second retransmission scheduling information of the second terminal device, the second retransmission scheduling information may also be configured by using the same configuration method as the first retransmission scheduling information, and the second retransmission scheduling information is added to the retransmission scheduling information. In this way, the first terminal device may directly read the first retransmission scheduling information to obtain the retransmission resource of the first terminal device, and the second terminal device may directly read the second retransmission scheduling information to obtain the retransmission resource of the second terminal device. In this way, the retransmission resources of the two terminal devices are not limited by each other.

Optionally, in a possible implementation, the radio access network device configures the first parameter for the first terminal device and the second terminal device, and the first parameter is used to determine the data transmission resource of the first terminal device and the data transmission resource of the second terminal device. When the retransmission scheduling information includes the first retransmission scheduling information of the first terminal device and the second retransmission scheduling information of the second terminal device, the radio access network device configures the retransmission scheduling information to include S segments. Each segment includes Q bits. An $i^{th}$ segment of Q bits is used to indicate whether to perform data retransmission for a data transmission process of a terminal device j (that is, each segment of Q bits is used to indicate whether to perform data retransmission for a data transmission process of a terminal device). A retransmission resource of the data transmission process of the terminal device j is determined based on retransmission scheduling information indicated by using a first segment to an $(i-1)^{th}$ segment of Q bits. A value of S is equal to a quantity of data transmission resources indicated by using the first parameter. Herein, S is a positive integer. The retransmission scheduling information indicates a data transmission process of a terminal device. Herein, i is not greater than S, j is not greater than S, and i and j are positive integers. Optionally, the radio access network device sorts the S segments of Q bits based on values of identifiers of different corresponding terminal devices and different process identifiers. For a terminal device, corresponding Q bits may be learned based on a sorting location at which the terminal device is located. For ease of understanding, it is assumed herein that the retransmission scheduling information includes four segments, each segment is two bits, a terminal device 1 has only two data transmission processes, a terminal device 2 has only one data transmission process, a terminal device 3 has only one data transmission process, and identifiers of the three terminal devices are in ascending order. In this case, a first segment of two bits corresponds to a first data transmission process of the terminal device 1, a second segment of two bits corresponds to a second data transmission process of the terminal device 1, a third segment of two bits corresponds to a data transmission process of the terminal device 2, and a fourth segment of two bits corresponds to a data transmission process of the terminal device 3. The terminal device 1 may learn, based on the first segment of two bits and the second segment of two bits in the retransmission scheduling information, whether to perform data retransmission for the two data transmission processes of the terminal device 1. The terminal device 2 learns, based on the third segment of two bits, whether to perform data retransmission for the data transmission process of the terminal device 2. The terminal device 3 learns, based on the fourth segment of two bits, whether to perform data retransmission for the data transmission process of the terminal device 3.

Specifically, a configuration manner of the retransmission scheduling information may be as follows:

In an example, if Q is equal to 1, the retransmission scheduling information uses the $i^{th}$ segment of Q bits to indicate whether to perform data retransmission for the data transmission process of the terminal device j; or if Q is greater than 1, the retransmission scheduling information uses Q−1 bits in the $i^{th}$ segment of Q bits to indicate a process identifier of the data transmission process corresponding to the terminal device j, and uses one bit in the $i^{th}$ segment of Q bits to indicate whether to perform data retransmission for the data transmission process corresponding to the terminal device j.

Based on the foregoing method, if the terminal device j has P data transmission processes, the S segments of the retransmission scheduling information include R segments of Q bits. Herein, R is not greater than S, R is a positive integer, and P is a positive integer.

If R is equal to 1, the retransmission scheduling information indicates a data transmission process corresponding to the terminal device j. In this case, when Q is equal to 1, another configuration parameter is used to indicate a process identifier corresponding to the data transmission process. When Q is greater than 1, Q−1 bits may be used to indicate a process identifier of the data transmission process corresponding to the segment of Q bits. Alternatively, if R is greater than 1 and less than P, each segment of Q bits in the R segments of Q bits indicated by using the retransmission scheduling information indicates one data transmission process corresponding to the terminal device j, that is, the R segments of Q bits in the retransmission scheduling information indicate R data transmission processes of the terminal device j. In this case, when Q is equal to 1, another configuration parameter is used to indicate a correspondence between each segment of Q bits in the R segments of Q bits and a data transmission process identifier of the terminal device j. For example, in the R segments of Q bits, a first segment of Q bit indicates a data transmission process 1 of the terminal device j, and a second segment of Q bit indicates a data transmission process 3 of the terminal device j. When Q is greater than 1, Q−1 bits in each segment in the R segments may be used to indicate a process identifier of a data transmission process corresponding to this segment of Q bits. Alternatively, if R is equal to P, the R segments of Q bits in the retransmission scheduling information are sorted in order based on process identifiers of the data transmission processes corresponding to the first terminal device. In other words, the current retransmission scheduling information indicates all the data transmission processes corresponding to the terminal device j. In this case, when Q is equal to 1, segments of Q bits are sorted in order based on the process identifiers of the data transmission processes corresponding to the terminal device j. For example, if the process identifiers of the data transmission processes corresponding to the terminal device j are 1, 2, 3, and 4, a first segment of Q bits corresponds to a data transmission process of the process identifier 1, a second segment of Q bits corresponds to a data transmission process of the process identifier 2, a third segment of Q bits corresponds to a data transmission process of the process identifier 3, and a fourth segment of Q bits corresponds to a data transmission process of the process identifier 4. When Q is greater than 1, Q−1 bits in each segment in the R segments may be used to indicate a process identifier of a data transmission process corresponding to this segment of Q bits.

Optionally, the foregoing describes configuration of the retransmission scheduling information and how the terminal device reads the retransmission scheduling information. The following describes the first parameter in this embodiment.

In an example, the first parameter is configured based on parameters of a configured grant physical uplink shared channel configured grant PUSCH. The second parameter is used to indicate that the data transmission resource indicated by using the first parameter is used for initial transmission and/or retransmission. The second parameter is included in the parameters of the configured grant PUSCH. It may be understood that the second parameter may be a newly added parameter, and the newly added parameter is included in the parameters of the configured grant PUSCH; or the second parameter may be a parameter of the configured grant PUSCH. In this way, the data transmission resource used for retransmission and the data transmission resource used for initial transmission are configured in the same manner, to effectively save configuration resources. In addition, use of data transmission resources can be effectively distinguished, to effectively use the data transmission resources.

In an example, the radio access network device uses first dedicated radio resource control signaling to configure a data transmission resource that is used for initial transmission and that is indicated by using the first parameter, and uses second dedicated radio resource control signaling to configure a data transmission resource that is used for retransmission and that is indicated by using the first parameter. In this way, the data transmission resource used for retransmission and the data transmission resource used for initial transmission are separately indicated, to effectively distinguish between use of the data transmission resources and effectively use the data transmission resources. In this solution, a quantity of parameter types that are used to configure a data transmission resource used for retransmission in the first parameter is less than a quantity of parameter types that are used to configure a data transmission resource used for initial transmission in the first parameter. For example, an initial transmission resource configuration parameter includes time domain resource location information, frequency domain resource location information, a quantity of transmission repetition times, a quantity of processes, a waveform parameter, a power control parameter, and the like; and a retransmission resource configuration parameter may include only one or more of time domain resource location information, frequency domain resource location information, or a quantity of transmission repetition times, and does not include a quantity of processes, a waveform parameter, and a power control parameter.

In an example, the first parameter is configured by using parameters of a configured grant PUSCH. A preset mapping relationship is met between a data transmission resource that is used for initial transmission and that is indicated by using the first parameter and a data transmission resource that is used for retransmission and that is indicated by using the first parameter. In this solution, the preset mapping relationship indicates that the data transmission resource that is used for initial transmission and that is indicated by using the first parameter and the data transmission resource that is used for retransmission and that is indicated by using the first parameter are data transmission resources corresponding to the same data transmission process and configuration parameters corresponding to the same configuration identifier. The configuration identifier is used to identify each data transmission resource of the first parameter. Alternatively, the preset mapping relationship indicates that the data transmission resource that is used for initial transmission and that is indicated by using the first parameter and the data transmission resource that is used for retransmission and that is indicated by using the first parameter are data transmission resources corresponding to the same data transmission process and configuration parameters corresponding to different configuration identifiers. A preset offset relationship exists between a configuration identifier of the data transmission resource that is used for initial transmission and that is indicated by using the first parameter and a configuration identifier of the data transmission resource that is used for retransmission and that is indicated by using the first parameter.

Based on the foregoing solution, the second parameter may be a newly added parameter. The newly added parameter is included in the parameters of the configured grant PUSCH. In this case, the second parameter is an explicit parameter. If the second parameter is a ternary parameter, different values of the second parameter may indicate different use statuses of a data transmission resource. For example, the radio access network device configures the second parameter to indicate that the data transmission resource is used for initial transmission; or the radio access network device configures the second parameter to indicate that the data transmission resource is used for retransmission; or the radio access network device configures the second parameter to indicate that the data transmission resource is used for initial transmission and retransmission (that is, the data transmission resource can be used for both initial transmission and retransmission). If the second parameter is a binary parameter, the radio access network device indicates the use status of the data transmission resource through configuring a value for the second parameter or not configuring a value for the second parameter. For example, when the radio access network device configures a value for the second parameter, the radio access network device configures the second parameter to indicate that the data transmission resource is used for initial transmission; or the radio access network device configures the second parameter to indicate that the data transmission resource is used for retransmission; or when the radio access network device does not configure the second parameter to indicate that the data transmission resource is used for initial transmission and retransmission (that is, the data transmission resource can be used for both initial transmission and retransmission).

Based on the foregoing solution, the second parameter is a parameter in the parameters of the configured grant PUSCH. The radio access network device configures a value of the second parameter. The value is used to indicate that the data transmission resource indicated by using the first parameter is used for initial transmission or retransmission. In this solution, in an example, the second parameter is a modulation and coding scheme and a transport block size. When a value of the modulation and coding scheme and the transport block size is from 0 to 27, it indicates initial transmission, or when a value of the modulation and coding scheme and the transport block size is from 28 to 31, it indicates retransmission. Alternatively, when a value of the modulation and coding scheme and the transport block size is from 0 to 28, it indicates initial transmission, or when a value of the modulation and coding scheme and the transport block size is from 29 to 31, it indicates retransmission. In an example, in initial transmission, when an index of the modulation and coding scheme is a value from 0 to 28, the terminal device may determine a modulation scheme and a bit rate in a current time of data transmission based on the value, and then determine a transport block size with reference to time-frequency resource information (provided by another parameter) allocated for this time of data transmission. In retransmission, a transport block used for data transmission remains unchanged. Therefore, the transport block size remains unchanged. The terminal device needs to obtain only modulation scheme information based on an index value corresponding to the modulation and coding scheme and the transport block size. Therefore, the value corresponding to the modulation and coding scheme and the transport block size in retransmission is a value from 29 to 31. In addition, in this example, a modulation scheme supported between the radio access network device and the terminal device is quadrature phase shift keying (QPSK), 16 quadrature amplitude modulation (16QAM), and 64 quadrature amplitude modulation (64QAM). Therefore, in retransmission, the value corresponding to the modulation and coding scheme and the transport block size is from 29 to 31. When four modulation schemes (for example, QPSK, 16QAM, 64QAM, and 256 quadrature amplitude modulation (256QAM)) are supported between the radio access network device and the terminal device, in retransmission, the value corresponding to the modulation and coding scheme and the transport block size is from 28 to 31.

In an example, the second parameter is a modulation and coding group. When the modulation and coding group is a non-low bit rate group, it indicates initial transmission, or when the modulation and coding group is a low bit rate group, it indicates retransmission.

In an example, the second parameter is a quantity of repetition times. When the quantity of repetition times is less than a preset threshold, it indicates initial transmission, or when the quantity of repetition times is greater than or equal to a preset threshold, it indicates retransmission. Alternatively, when the quantity of repetition times is less than or equal to a preset threshold, it indicates initial transmission, or when the quantity of repetition times is greater than a preset threshold, it indicates retransmission.

According to a third aspect, an embodiment of this application provides a terminal device. The terminal device is the first terminal device in the embodiments of this application. The apparatus has a function for implementing operations of the first terminal device in the first aspect or the second aspect. The function may be implemented by hardware, or may be implemented by hardware executing corresponding software. The hardware or the software includes one or more modules corresponding to the foregoing function.

In a possible implementation, the apparatus includes units or modules configured to perform the steps in the first aspect or the second aspect. For example, the apparatus includes a transceiver module and a processing module. The transceiver module is configured to: obtain a first parameter and location indication information that are configured by a radio access network device, where the first parameter is used to determine a data transmission resource of the first terminal device, and the location indication information is used to indicate a location of first retransmission scheduling information corresponding to the first terminal device in retransmission scheduling information; and send uplink data to the radio access network device, and receive the retransmission scheduling information sent by the radio access network device.

The processing module is configured to determine a retransmission resource based on the retransmission scheduling information, the location indication information, and the first parameter.

The transceiver module is configured to retransmit the uplink data to the radio access network device by using the retransmission resource.

Optionally, the apparatus further includes a storage module, configured to store program instructions and data that are necessary for the first terminal device.

In a possible implementation, the apparatus includes a processor and a transceiver. The processor is configured to support the first terminal device in performing the corresponding function in the method provided in the first aspect or the second aspect. The transceiver is configured to: indicate communication between the first terminal device and the radio access network device, and send information or signaling in the foregoing method to the radio access network device. Optionally, the apparatus may further include a memory. The memory is coupled to the processor, and stores program instructions and data that are necessary for the first terminal device.

In a possible implementation, when the apparatus is a chip in the first terminal device, the chip includes a processing module and a transceiver module. The transceiver module may be, for example, a transceiver in the chip. The transceiver is configured to: obtain a first parameter and location indication information that are configured by a radio access network device, where the first parameter is used to determine a data transmission resource of the first terminal device, and the location indication information is used to indicate a location of first retransmission scheduling information corresponding to the first terminal device in retransmission scheduling information; and send uplink data to the radio access network device, and receive the retransmission scheduling information sent by the radio access network device. The processing module may be, for example, a processor. The processor is configured to determine a retransmission resource based on the retransmission scheduling information, the location indication information, and the first parameter. The transceiver module may be, for example, an input/output interface, a pin, or a circuit in the chip. The transceiver module transmits to-be-transmitted data to another chip or module coupled to the chip. The processing unit may execute computer executable instructions stored in a storage unit, to support the first terminal device to perform the method provided in the first aspect or the second aspect. Optionally, the storage unit may be a storage unit in the chip, for example, a register or a cache. The storage unit may alternatively be a storage unit that is located outside the chip, for example, a read-only memory (ROM for short) or another type of static storage device that can store static information and instructions or a random access memory (RAM).

In a possible implementation, the apparatus includes a processor, a baseband circuit, a radio frequency circuit, and an antenna. The processor is configured to implement control on some functions of each circuit. The baseband circuit is configured to: generate a data frame including signaling information, perform processing such as analog conversion, filtering, amplification, and up-conversion on the data frame by using the radio frequency circuit, and send the processed data frame to the radio access network device by using the antenna. Optionally, the apparatus further includes a memory. The memory stores program instructions and data that are necessary for the first terminal device.

The processor mentioned anywhere above may be a general-purpose central processing unit (CPU), a microprocessor, an application-specific integrated circuit (ASIC), or one or more integrated circuits configured to control program execution of the data retransmission method in the foregoing aspects.

According to a fourth aspect, an embodiment of this application provides a radio access network device. The apparatus has a function of implementing operations of the radio access network device in the first aspect or the second aspect. The function may be implemented by hardware, or may be implemented by hardware executing corresponding software. The hardware or the software includes one or more modules corresponding to the foregoing function.

In a possible implementation, the apparatus includes units or modules configured to perform the steps in the first aspect or the second aspect. For example, the apparatus includes a processing module and a sending module. The processing module is configured to configure a first parameter and location indication information for a first terminal device. The first parameter is used to determine a data transmission resource of the first terminal device. The location indication information is used to indicate a location of first retransmission scheduling information corresponding to the first terminal device in retransmission scheduling information.

The sending module is configured to: receive uplink data sent by the first terminal device, and send the retransmission scheduling information to the first terminal device; and receive the uplink data retransmitted by the first terminal device.

Optionally, the apparatus further includes a storage module, configured to store program instructions and data that are necessary for the radio access network device.

In a possible implementation, the apparatus includes a processor and a transceiver. The processor is configured to support the radio access network device to perform the corresponding function in the method provided in the first aspect or the second aspect. The transceiver is configured to: indicate communication between a terminal device and the radio access network device, and send information or instructions in the foregoing method to the terminal device. Optionally, the apparatus may further include a memory. The memory is coupled to the processor, and stores program instructions and data that are necessary for the radio access network device.

In a possible implementation, when the apparatus is a chip in the radio access network device, the chip includes a processing module and a transceiver module. The processing module may be, for example, a processor in the chip. The processor is configured to configure a first parameter and location indication information for the first terminal device. The first parameter is used to determine a data transmission resource of the first terminal device. The location indication information is used to indicate a location of first retransmission scheduling information corresponding to the first terminal device in the retransmission scheduling information. The transceiver module may be, for example, an input/output interface, a pin, or a circuit in the chip, and send the retransmission scheduling information to another chip or module coupled to the chip. The processing unit may execute computer executable instructions stored in a storage unit, to support the radio access network device to perform the method provided in the first aspect or the second aspect. Optionally, the storage unit may be a storage unit in the chip, for example, a register or a cache. The storage unit may alternatively be a storage unit that is located outside the chip, for example, a read-only memory (ROM) or another type of static storage device that can store static information and instructions or a random access memory (RAM).

In a possible implementation, the apparatus includes a processor, a baseband circuit, a radio frequency circuit, and an antenna. The processor is configured to implement control on some functions of each circuit. The baseband circuit is configured to: generate retransmission scheduling information including signaling information, perform processing such as analog conversion, filtering, amplification, and up-conversion on the information by using the radio frequency circuit, and send the processed information to the terminal device by using the antenna. Optionally, the apparatus further includes a memory. The memory stores program instructions and data that are necessary for the radio access network device.

The processor mentioned anywhere above may be a general-purpose central processing unit (CPU), a microprocessor, an application-specific integrated circuit (ASIC), or one or more integrated circuits configured to control program execution of the data retransmission method in the foregoing aspects.

According to a fifth aspect, an embodiment of this application provides a computer-readable storage medium. The computer storage medium stores computer instructions. When the computer instructions are invoked, the method in any possible implementation of the first aspect and the second aspect is performed.

According to a sixth aspect, an embodiment of this application provides a computer program product including instructions. When the computer program product runs on a computer, the computer is enabled to perform the method according to any one of the foregoing aspects.

According to a seventh aspect, this application provides a chip system. The chip system includes a processor, configured to support a radio access network device or a terminal device to implement a function in the foregoing aspect, for example, generating or processing data and/or information in the foregoing method. In a possible design, the chip system further includes a memory. The memory is configured to store program instructions and data that are necessary for a data sending device, to implement a function in any one of the foregoing aspects. The chip system may include a chip, or may include a chip and another discrete component.

In a possible implementation, when the chip system runs on a terminal device side, the terminal device may be supported to perform the method provided in the first aspect or the second aspect.

In another possible implementation, when the chip system runs on a radio access network device side, the radio access network device may be supported to perform the method provided in the first aspect or the second aspect.

According to an eighth aspect, an embodiment of this application provides a communications system. The system includes the radio access network device side and the terminal device in the foregoing aspects.

DETAILED DESCRIPTION OF ILLUSTRATIVE EMBODIMENTS

The embodiments of this application provide a data retransmission method and a related apparatus, to reduce downlink control overheads of retransmission scheduling.

In this application, terms such as "first", "second", "third", and "fourth" (if exists) in this specification, the claims, and the accompanying drawings are intended to distinguish between similar objects but do not necessarily indicate a specific order or sequence. It should be understood that the data used in such a way are interchangeable in proper cases so that the embodiments described herein can be implemented in an order except the order illustrated or described herein. Moreover, terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

Figure 3:
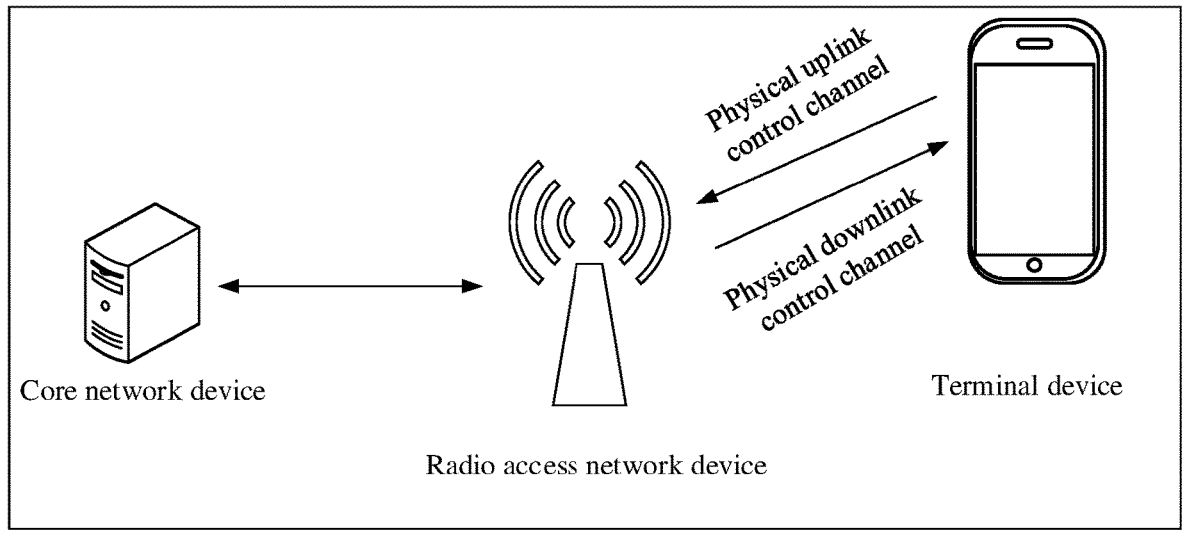
FIG. 3 is a schematic diagram of system architecture in data retransmission according to an embodiment of this application.

The technical solutions provided in the embodiments of this application are applied to a mobile communications system shown in FIG. 3. The mobile communications system includes a core network device, a radio access network device, and a terminal device. The radio access network device is a network-side entity configured to transmit or receive a signal. The terminal device is a user-side entity configured to receive or transmit a signal. The radio access network device may be any device with a wireless transmitting/receiving function. The radio access network device includes but is not limited to: an evolved NodeB (NodeB or eNB or e-NodeB) in long term evolution (LTE), a gNodeB (gNB) or a transmission/reception point (TRP) in a new radio access technology (NR), an evolved NodeB in a 3rd generation partnership project (3GPP), an access node in a wireless-fidelity (WiFi) system, a wireless relay node, a wireless backhaul node, and the like. The base station may be a macro base station, a micro base station, a picocell base station, a small cell, a relay station, a balloon station, or the like. A plurality of base stations may support the aforementioned networks of a same technology, or may support the aforementioned networks of different technologies. The base station may include one or more co-site or non-co-site TRPs. The network device may alternatively be a radio controller, a centralized unit (CU), and/or a distributed unit (DU) in a cloud radio access network (CRAN) scenario. Alternatively, the radio access network device may be a server, a wearable device, an in-vehicle device, or the like. The following describes an example in which the radio access network device is a base station. The plurality of radio access network devices may be base stations in the same type, or may be base stations in different types. The base station may communicate with a terminal device, or may communicate with a terminal device by using a relay station. The terminal device may communicate with a plurality of base stations by using different technologies. For example, the terminal device may communicate with a base station supporting an LTE network, may communicate with a base station supporting a 5G network, and may further support a dual connection to a base station in an LTE network and a base station in a 5G network.

The terminal is a device with a wireless transmitting/receiving function. The terminal may be deployed on land, indoor or outdoor, or may be hand-held, wearable or vehicle-mounted; may be deployed on a water surface (for example, on a ship); or may be deployed in the air (for example, on an airplane, a balloon, or a satellite). The terminal may be a mobile phone, a tablet computer, a computer with a wireless transmitting/receiving function, a virtual reality (VR) terminal device, an augmented reality (AR) terminal device, a wireless terminal in industrial control, a vehicle-mounted terminal device, a wireless terminal in self driving, a wireless terminal in telemedicine, a wireless terminal in a smart grid, a wireless terminal in transportation safety, a wireless terminal in a smart city, a wireless terminal in a smart home, a wearable terminal device, or the like. An application scenario is not limited in the embodiments of this application. The terminal may also be sometimes referred to as a terminal device, user equipment (UE), an access terminal device, a vehicle-mounted terminal, an industrial control terminal, a UE unit, a UE station, a mobile station, a mobile console, a remote station, a remote terminal device, a mobile device, a UE terminal device, a terminal device, a wireless communications device, a UE agent, a UE apparatus, or the like. The terminal may be fixed or mobile. The relay may be the foregoing network device, or may be the foregoing terminal.

Figure 1:
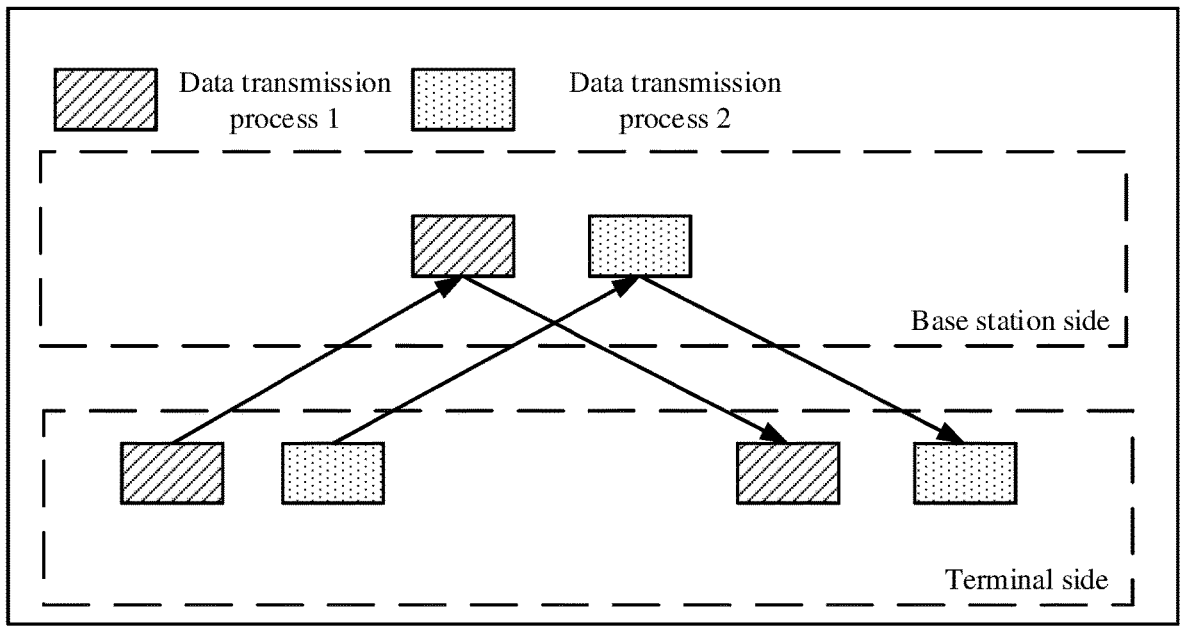
FIG. 1 is a schematic diagram of transmission in a data transmission process of data retransmission according to an embodiment of this application.
Figure 2:
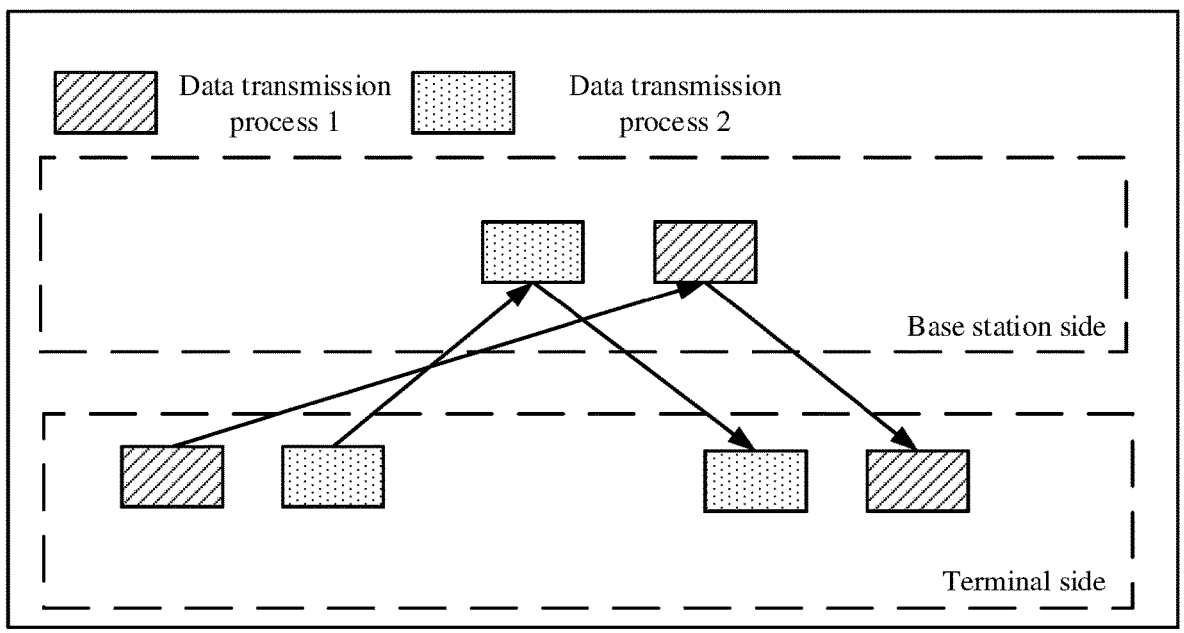
FIG. 2 is another schematic diagram of transmission in a data transmission process of data retransmission according to an embodiment of this application.

In the system architecture shown in FIG. 3, when data exchange is performed between the radio access network device and the terminal device, the radio access network device schedules resources for data transmission performed by the terminal device. Uplink data transmission is used as an example. An HARQ process indicates a process in which a user sends an uplink data packet (sent after scheduling performed by the base station or independently sent by the user) and retransmits the data packet (optional) until the base station correctly receives the data packet. As shown in FIG. 1, when the terminal device transmits data to the base station, there are two data transmission processes. In a scenario shown in FIG. 1, the data transmission processes are sorted in order in a sending process and a receiving process, that is, first sent first received. In an actual case, for different processes, an order of data transmission, retransmission scheduling, and data retransmission may be disrupted. FIG. 2 is used as an example. In initial transmission, a data transmission process 1 is before a data transmission process 2. However, in retransmission scheduling and data retransmission, the data transmission process 1 is after the data transmission process 2. In this way, order disruption allows the base station to flexibly implement scheduling. To ensure that the data transmission process 1 is not confused with the data transmission process 2 when the terminal device receives retransmission scheduling and when the base station receives the uplink data, a process number of each time of transmission may be specified. For dynamic uplink scheduling, the base station adds the process number to downlink control information (DCI) for uplink data scheduling, and the terminal device determines a specific process corresponding to this time of scheduling to perform correct data transmission/retransmission. However, retransmission performed on a configured grant PUSCH needs to be dynamically scheduled by the base station through delivering a physical downlink control channel (PDCCH). For a service scenario of a small data packet and large user density, a PDCCH needs to be delivered for retransmission of each user. In this case, overheads of downlink control information are large, thereby affecting a network capacity.

To resolve this problem, the embodiments of this application provide the following solutions: A radio access network device configures a first parameter and location indication information for a first terminal device. The first parameter is used to determine a data transmission resource of the first terminal device. The location indication information is used to indicate a location of first retransmission scheduling information corresponding to the first terminal device in retransmission scheduling information. Then, the first terminal device sends uplink data to the radio access network device, and the radio access network device receives the uplink data. Afterwards, the radio access network device sends the retransmission scheduling information to the first terminal device. The first terminal device determines a retransmission resource based on the retransmission scheduling information, the location indication information, and the first parameter. Finally, the first terminal device retransmits the uplink data to the radio access network device by using the retransmission resource.

The following describes some technical terms in the embodiments of this application, to facilitate understanding by persons skilled in the art.

Configured grant Type1 indicates semi-persistent scheduling (SPS). Receiving a higher-layer parameter (configuredGrantConfig) with a radio resource control-uplink grant (rrc-Configured Uplink Grant) and skipping receiving downlink control information (DCI) are referred to as "Type1 PUSCH transmission with a configured grant" or briefly referred to as "configured grant Type1" in the protocol.

Configured grant Type2 is similar to SPS scheduling in the LTE. First receiving a higher-layer parameter configuredGrantConfig without rrc-ConfiguredUplinkGrant and then performing activation or deactivation by using L1 signaling are referred to as "Type2 PUSCH transmission with a configured grant" or briefly referred to as "configured grant Type2" in the protocol.

Parameter examples of the configured grant PUSCH include a frequency hopping manner indication (frequency Hopping), an uplink demodulation reference signal (DMRS) configuration, a modulation and coding scheme (MCS) table when precoding is not sent, an MCS table when precoding is sent, a parameter when uplink control information (UCI) is transmitted by using a PUSCH, a resource configuration manner, a resource block group (RBG) size, a power control related configuration, a quantity of HARQ processes, a quantity of repetition times, an RV version used for a quantity of repetition times, a period, a start symbol, a length, a frequency domain resource, and the like. The following mainly describes the quantity of repetition times, the RV version used for the quantity of repetition times, and the period.

The period is used to indicate a time interval between two groups of adjacent transmission opportunities. In the release15 version, a minimum value and a maximum value of a period of configured grant PUSCH resources are respectively two transmission symbols and 5120 slots.

Figure 4:
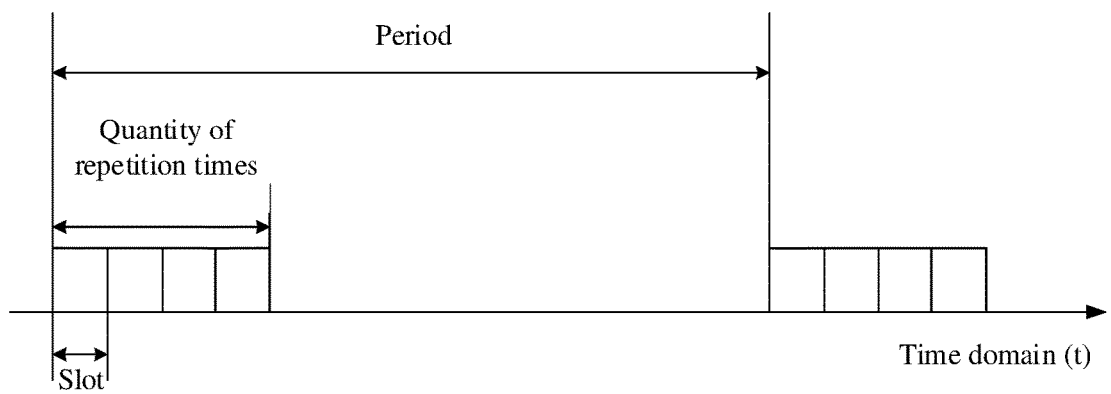
FIG. 4 is a schematic diagram of a relationship between a quantity of repetition times and a period according to an embodiment of this application.

The quantity of repetition times (repK) is used to indicate a quantity of transmission opportunities included in each group of transmission opportunities, that is, the quantity of retransmission times. A value of K for the configured grant PUSCH resource in the release15 version includes (1, 2, 4, 8). When the period is less than or equal to one slot, the quantity of repetition times can only be 1. In an example solution, a relationship between the period and the quantity of repetition times may be shown in FIG. 4. The quantity of repetition times is 4 in one period.

For an $n^{th}$ transmission opportunity in K times of transmission, a $(mod(n-1, 4)+1)^{th}$ value in an RV sequence is used, where n=1, 2, . . . , K. Herein, repK-RV includes four cases: not configured, configured as {0, 2, 3, 1}, configured as {0, 3, 0, 3}, and configured as {0, 0, 0, 0}.

When K is equal to 1, the parameter repK-RV is not configured in Configured Grant Config, and an RV version of transmission is set to 0.

Figure 5:
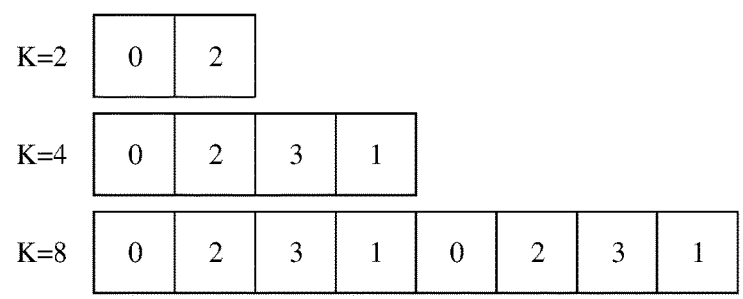
FIG. 5 is a schematic diagram of an RV version in a retransmission process according to an embodiment of this application.

When K is equal to 2, 4, or 8, if a configured RV sequence is {0, 2, 3, 1}, initial transmission can only be performed in a first transmission opportunity in K times of retransmission. In other words, there are several possibilities of repeated transmission shown in FIG. 5.

Figure 6:
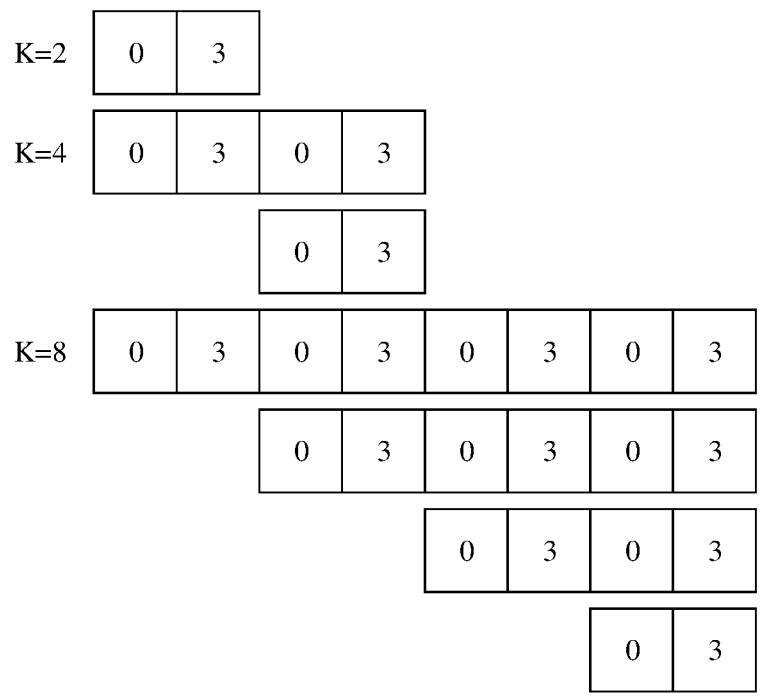
FIG. 6 is another schematic diagram of an RV version in a retransmission process according to an embodiment of this application.

If a configured RV sequence is {0, 3, 0, 3}, initial transmission may be performed in any transmission opportunity corresponding to RV=0 in K repetition times. In other words, there are several possibilities of retransmission shown in FIG. 6. For example, as shown in FIG. 6, when K is equal to 4, a possibility of retransmission in the RV configuration includes starting data transmission at a first transmission opportunity or starting data transmission at a third transmission opportunity.

Figure 7:
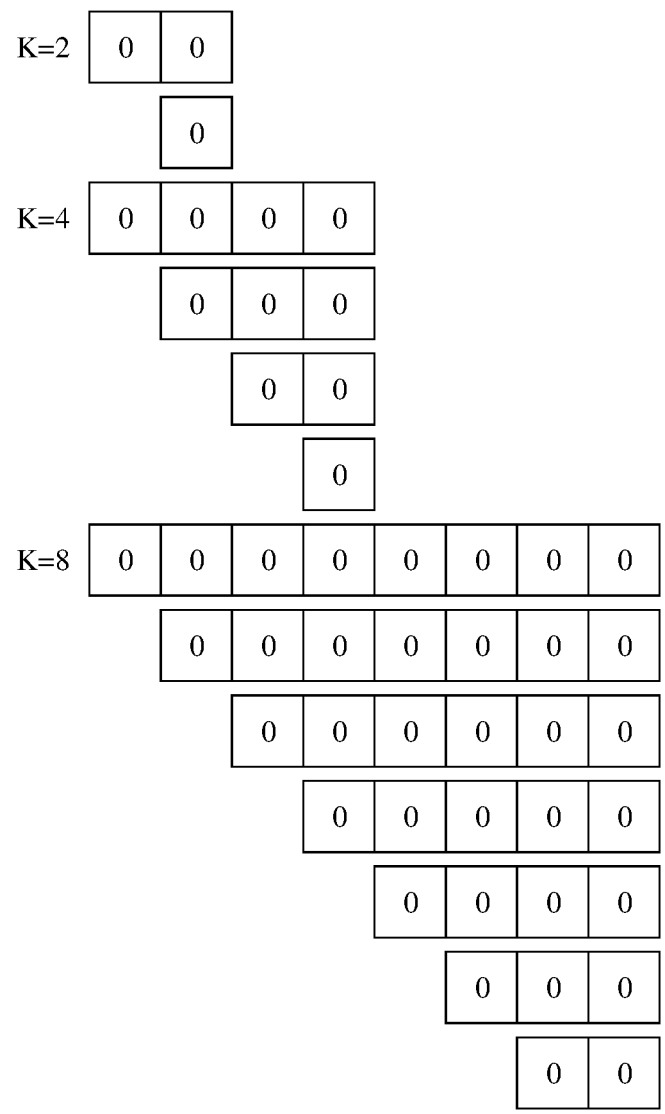
FIG. 7 is another schematic diagram of an RV version in a retransmission process according to an embodiment of this application.

If a configured RV sequence is {0, 0, 0, 0}, initial transmission may be performed in any transmission opportunity in K repetition times. An only exception is a case in which K=8. In this case, the initial transmission cannot be performed in a last transmission opportunity. In other words, there are several possibilities of retransmission shown in FIG. 7.

Figure 8:
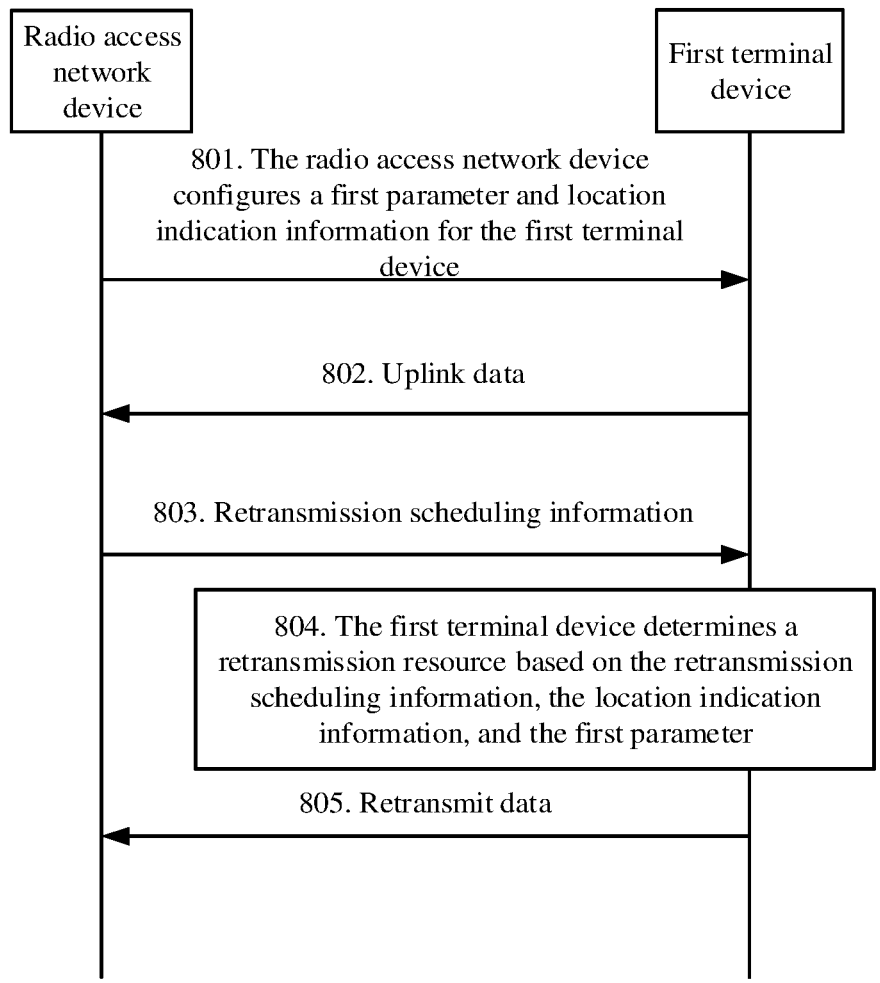
FIG. 8 is a schematic diagram of an embodiment of a data retransmission method according to an embodiment of this application.

For details, refer to FIG. 8, an embodiment of a data retransmission method in an embodiment of this application includes the following steps:

801. A radio access network device configures a first parameter and location indication information for a first terminal device. The first parameter is used to determine a data transmission resource of the first terminal device. The location indication information is used to indicate a location of first retransmission scheduling information corresponding to the first terminal device in retransmission scheduling information.

In this embodiment, the radio access network device preconfigures, for the first terminal device, the first parameter used to determine a data transmission resource and the location indication information used to indicate the location of the retransmission scheduling information. It may be understood that the first parameter is used to configure a plurality of data transmission resources, and one configuration identifier is configured for each data transmission resource. The configuration identifier is used to identify a data transmission resource. For example, four data transmission resources are configured by using the first parameter, and configuration identifiers of the four data transmission resources may be respectively 1, 2, 3, and 4. The location indication information may be used to indicate the location of the first retransmission scheduling information corresponding to the first terminal device in the retransmission scheduling information. For example, if the radio access network device configures that the first retransmission scheduling information corresponding to the first terminal device is located in a third segment of the retransmission scheduling information, the first terminal device may directly read the third segment of information in the retransmission scheduling information after receiving the retransmission scheduling information, to obtain the first retransmission scheduling information. In addition, it may be alternatively understood that the first parameter is used to configure a plurality of data transmission resources for one terminal device set, and one configuration identifier is configured for each data transmission resource. For example, a terminal device set (that is, a user group) including the first terminal device includes three terminal devices, which are respectively the first terminal device, a second terminal device, and a third terminal device. The first parameter is used to determine a data transmission resource of the first terminal device. Six data transmission resources are configured by using the first parameter. Configuration identifiers of the six data transmission resources are respectively 1, 2, 3, 4, 5, and 6. A second parameter may be configured for the second terminal device. Five data transmission resources are configured by using the second parameter. Configuration identifiers of the five data transmission resources are respectively 1, 2, 3, 4, and 5. The location indication information may be used to indicate the location of the retransmission scheduling information corresponding to the terminal device. For example, the radio access network device configures the first retransmission scheduling information corresponding to the first terminal device to be located in a third segment of the retransmission scheduling information. After receiving the retransmission scheduling information, the first terminal device may directly read the third segment of the retransmission scheduling information to obtain the first retransmission scheduling information. The radio access network device configures second retransmission scheduling information corresponding to the second terminal device to be located in a second segment of the retransmission scheduling information. After receiving the retransmission scheduling information, the second terminal device may directly read the second segment of the retransmission scheduling information to obtain the second retransmission scheduling information. The radio access network device configures third retransmission scheduling information corresponding to the third terminal device to be located in a first segment of the retransmission scheduling information. After receiving the retransmission scheduling information, the third terminal device may directly read the first segment of the retransmission scheduling information to obtain the third retransmission scheduling information.

In this embodiment, a configuration manner of the first parameter may have the following several possible implementations:

In an example, the first parameter is configured based on parameters of a configured grant PUSCH. The second parameter is used to indicate that a data transmission resource indicated by using the first parameter is used for initial transmission and/or retransmission. The second parameter is included in the parameters of the configured grant PUSCH. It may be understood that the second parameter may be a newly added parameter, and the newly added parameter is included in the parameters of the configured grant PUSCH; or the second parameter may be a parameter of the configured grant PUSCH. In this way, the data transmission resource used for retransmission and the data transmission resource used for initial transmission are configured in the same manner, to effectively save configuration resources. In addition, use of data transmission resources can be effectively distinguished, to effectively use the data transmission resources.

In an example, the radio access network device uses first dedicated radio resource control signaling to configure a data transmission resource that is used for initial transmission and that is indicated by using the first parameter, and uses second dedicated radio resource control signaling to configure a data transmission resource that is used for retransmission and that is indicated by using the first parameter. In this way, the data transmission resource used for retransmission and the data transmission resource used for initial transmission are separately indicated, to effectively distinguish between use of the data transmission resources and effectively use the data transmission resources. In this solution, a quantity of parameter types that are used to configure a data transmission resource used for retransmission in the first parameter is less than a quantity of parameter types that are used to configure a data transmission resource used for initial transmission in the first parameter. It may be understood that, when the data transmission resource used for initial transmission is configured, the data transmission resource may be configured based on the parameters of the configured grant PUSCH; and when the data transmission resource used for retransmission is configured, only some parameters in the parameters of the configured grant PUSCH may be correspondingly configured. For example, the initial transmission resource configuration parameter includes time domain resource location information, frequency domain resource location information, a quantity of transmission repetition times, a quantity of data transmission processes, a waveform parameter (the waveform parameter is used to indicate a waveform used for sending uplink data, for example, a cyclic prefix orthogonal frequency division multiplexing (CP-OFDM) or a single-carrier frequency division multiple access (SC-FDMA)), a power control parameter, and the like. The retransmission resource configuration parameter may include only one or more of time domain resource location information, frequency domain resource location information, or a quantity of transmission repetition times, and does not include a quantity of data transmission processes, a waveform parameter, and a power control parameter.

In an example, the first parameter is configured by using parameters of a configured grant PUSCH. A preset mapping relationship is met between a data transmission resource that is used for initial transmission and that is indicated by using the first parameter and a data transmission resource that is used for retransmission and that is indicated by using the first parameter. In this solution, the preset mapping relationship indicates that the data transmission resource that is used for initial transmission and that is indicated by using the first parameter and the data transmission resource that is used for retransmission and that is indicated by using the first parameter are data transmission resources corresponding to the same data transmission process and configuration parameters corresponding to the same configuration identifier. The configuration identifier is used to identify each data transmission resource of the first parameter. Alternatively, the preset mapping relationship indicates that the data transmission resource that is used for initial transmission and that is indicated by using the first parameter and the data transmission resource that is used for retransmission and that is indicated by using the first parameter are data transmission resources corresponding to the same data transmission process and configuration parameters corresponding to different configuration identifiers. A preset offset relationship exists between a configuration identifier of the data transmission resource that is used for initial transmission and that is indicated by using the first parameter and a configuration identifier of the data transmission resource that is used for retransmission and that is indicated by using the first parameter. For example, after the data transmission resource is configured, the radio access network device indicates the first terminal device to perform data retransmission in a first data process by using a data transmission resource whose configuration identifier is 1 if the first terminal device performs initial data transmission in the first data process by using the data transmission resource whose configuration identifier is 1. Alternatively, the radio access network device indicates the first terminal device to perform data retransmission in a first data process by using a data transmission resource whose configuration identifier is 3 if the first terminal device performs initial data transmission in the first data process by using a data transmission resource whose configuration identifier is 1. Alternatively, the radio access network device indicates the first terminal device to perform data retransmission in a first data process by using a data transmission resource whose configuration identifier is 4 if the first terminal device performs initial data transmission in the first data process by using a data transmission resource whose configuration identifier is 2. In the latter two examples, a fixed offset relationship between a configuration identifier of a data transmission resource used for initial data transmission and a configuration identifier of a data transmission resource used for data retransmission is 2.

Based on the foregoing solution, the second parameter may be a newly added parameter. The newly added parameter is included in the parameters of the configured grant PUSCH. In this case, the second parameter is an explicit parameter. If the second parameter is a ternary parameter, different values of the second parameter may indicate different use statuses of a data transmission resource. For example, the radio access network device configures the second parameter to indicate that the data transmission resource is used for initial transmission; or the radio access network device configures the second parameter to indicate that the data transmission resource is used for retransmission; or the radio access network device configures the second parameter to indicate that the data transmission resource is used for initial transmission and retransmission (that is, the data transmission resource can be used for both initial transmission and retransmission). If the second parameter is a binary parameter, the radio access network device indicates the use status of the data transmission resource through configuring a value for the second parameter or not configuring a value for the second parameter. For example, when the radio access network device configures a value for the second parameter, the radio access network device configures the second parameter to indicate that the data transmission resource is used for initial transmission; or the radio access network device configures the second parameter to indicate that the data transmission resource is used for retransmission; or when the radio access network device does not configure the second parameter to indicate that the data transmission resource is used for initial transmission and retransmission (that is, the data transmission resource can be used for both initial transmission and retransmission).

The second parameter may alternatively be a parameter of the configured grant PUSCH. The radio access network device configures a value of the second parameter. The value is used to indicate that the data transmission resource indicated by using the first parameter is used for initial transmission or retransmission. In this solution, in an example, the second parameter is a modulation and coding scheme and a transport block size (mcsAndTBS). The terminal device may obtain an MCS through querying a table based on the value of the second parameter, and obtain a TBS based on data indicated by using the second parameter and a time-frequency resource of a transport block. When a value corresponding to the modulation and coding scheme and the transport block size is from 0 to 27, it indicates initial transmission, or when a value corresponding to the modulation and coding scheme and the transport block size is from 28 to 31, it indicates retransmission. Alternatively, when a value corresponding to the modulation and coding scheme and the transport block size is from 0 to 28, it indicates initial transmission, or when a value corresponding to the modulation and coding scheme and the transport block size is from 29 to 31, it indicates retransmission. In an example, in initial transmission, when an index of the modulation and coding scheme is a value from 0 to 28, the terminal device may determine a modulation scheme and a bit rate in a current time of data transmission based on the value, and then determine a transport block size with reference to time-frequency resource information (provided by another parameter) allocated for this time of data transmission. In retransmission, a transport block used for data transmission remains unchanged. Therefore, the transport block size remains unchanged. The terminal device needs to obtain only modulation scheme information based on an index value corresponding to the modulation and coding scheme and the transport block size. Therefore, the value corresponding to the modulation and coding scheme and the transport block size in retransmission is a value from 29 to 31. In addition, in this example, a modulation scheme supported between the radio access network device and the terminal device is QPSK, 16QAM, and 64QAM. Therefore, in retransmission, the value corresponding to the modulation and coding scheme and the transport block size is from 29 to 31. When four modulation schemes (for example, QPSK, 16QAM, 64QAM, and 256QAM) are supported between the radio access network device and the terminal device, in retransmission, the value corresponding to the modulation and coding scheme and the transport block size is from 28 to 31.

In an example, the second parameter is a modulation and coding group. When the modulation and coding group is a non-low bit rate group, it indicates initial transmission, or when the modulation and coding group is a low bit rate group, it indicates retransmission. In this embodiment, a plurality of modulation and coding scheme tables are preset in the NR protocol. One type of modulation and coding scheme table is an MCS table that can support an extremely low coding bit rate, to ensure transmission of a service that requires extremely high reliability. For such type of service, an MCS table with a common bit rate may be used for initial transmission to ensure transmission efficiency. A table with an extremely low coding bit rate is used for retransmission, to ensure a correctness rate. A low bit rate group is a plurality of bit rates that include an extremely low coding bit rate. The extremely coding low bit rate is a bit rate corresponding to spectral efficiency less than 0.1.

In an example, the second parameter is a quantity of repetition times. When the quantity of repetition times is less than a preset threshold, it indicates initial transmission, or when the quantity of repetition times is greater than or equal to a preset threshold, it indicates retransmission. Alternatively, when the quantity of repetition times is less than or equal to a preset threshold, it indicates initial transmission, or when the quantity of repetition times is greater than a preset threshold, it indicates retransmission. NR supports multi-slot data transmission. In other words, each time of data transmission is repeated for N slots. The same transmission resource block is sent in each slot. A value of N is configured by the radio access network device by using higher-layer signaling. For initial transmission, repetition may be performed for a smaller quantity N of times, to ensure transmission efficiency. For retransmission, repetition may be implemented for a larger quantity N of times, to ensure a correctness rate. A specific preset threshold is set by the radio access network device. The preset threshold does not exceed a maximum value of a quantity of transmission opportunities included in each group of transmission opportunities.

802. The first terminal device sends uplink data to the radio access network device.

In a data exchange scenario, the first terminal device sends the uplink data to the radio access network device. It may be understood that the uplink data may be first transmitted data, or may be retransmitted data.

803. The radio access network device sends the retransmission scheduling information to the first terminal device.

After receiving the uplink data sent by the first terminal device, the radio access network device determines whether the first terminal device needs to be scheduled to perform data retransmission. If the first terminal device needs to be scheduled to perform data retransmission, the radio access network device configures the retransmission scheduling information for the first terminal device.

In this embodiment, the retransmission scheduling information is configured to include retransmission scheduling information of a plurality of terminal devices. The radio access network device sends the retransmission scheduling information for one time. All the terminal devices included in the retransmission scheduling information can receive the retransmission scheduling information. Alternatively, the radio access network device separately sends the retransmission scheduling information to the terminal devices included in the retransmission scheduling information.

Figure 9:
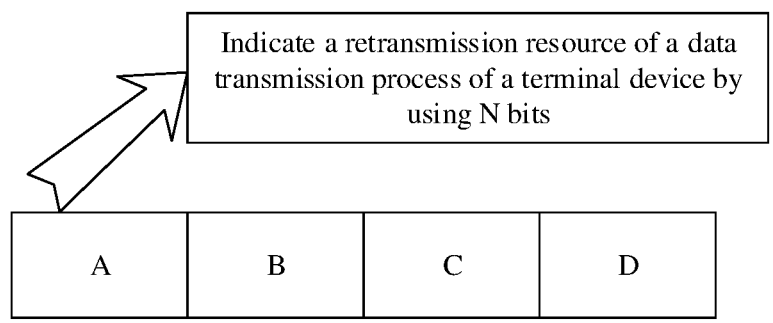
FIG. 9 is a schematic diagram of a partial structure of retransmission scheduling information for indicating a retransmission resource according to an embodiment of this application.

In this embodiment, a manner in which the radio access network device configures the retransmission scheduling information may have the following several possible cases:

The retransmission scheduling information uses N bits to indicate a retransmission resource of a data transmission process corresponding to the first terminal device. Herein, N is a positive integer. In addition, when the first terminal device exchanges data with the radio access network device, the radio access network device indicates, to the first terminal device, a specific data process to which the retransmission resource is used. Therefore, the retransmission scheduling information is further used to indicate the data transmission process of the first terminal device. The retransmission resource is included in a data transmission resource indicated by using the first parameter. Specifically, FIG. 9 is a schematic diagram of a partial structure of retransmission scheduling information for indicating a retransmission resource. If the radio access network device and four terminal device groups are one user group, a part of the retransmission scheduling information for indicating the retransmission resource is divided into four segments. Each segment is used to indicate retransmission scheduling information of one terminal device. For example, a segment A corresponds to the first terminal device, a segment B corresponds to the second terminal device, a segment C corresponds to the third terminal device, and a segment D corresponds to a fourth terminal device. The radio access network device allocates N bits to indicate retransmission scheduling information of one data transmission process of one terminal device.

Based on the foregoing method, the retransmission scheduling information indicates the data transmission process of the first terminal device. Details are as follows:

In an example, if the first terminal device corresponds to X data transmission processes, the retransmission scheduling information uses X groups of N bits to indicate retransmission resources corresponding to the X data transmission processes of the first terminal device. The X groups of N bits are sorted in order based on process identifiers of the X data transmission processes, so that the first terminal device can sequentially obtain a retransmission resource corresponding to a data transmission process. Herein, X is a positive integer. For example, the first terminal device corresponds to three data transmission processes, and process identifiers of the three data transmission processes are respectively 11, 22, and 33. In this case, the radio access network device configures three N bits at corresponding locations of the retransmission scheduling information for the first terminal device. In an example, a location order of the three N bits is as follows: N bits used to indicate the retransmission resource for the data transmission process 11 rank first, N bits used to indicate the retransmission resource for the data transmission process 22 rank second, and N bits used to indicate the retransmission resource for the data transmission process 33 rank third. The three N bits may be consecutively sorted, or may be inconsecutively sorted. The specific sorting order may be set by the radio access network device, provided that the radio access network device and the first terminal device both agree on the order and the first terminal device can obtain the corresponding retransmission resource.

In another example, if the first terminal device corresponds to X data transmission processes, the retransmission scheduling information uses Y bits to indicate a process identifier of a data transmission process corresponding to the first terminal device, and uses N bits to indicate a retransmission resource of the data transmission process corresponding to the first terminal device. For example, if process identifiers of data transmission processes corresponding to the first terminal device are respectively 1, 2, and 3, two bits may be used to indicate the process identifier. For example, 00 represents a data transmission process whose process identifier is 1, 01 represents a data transmission process whose process identifier is 2, and 10 represents a data transmission process whose process identifier is 3.

In another example, the retransmission scheduling information uses a parameter of downlink control information to indicate a process identifier of a data transmission process corresponding to the first terminal device. The parameter of the downlink control information is a search space configuration, a radio network temporary identifier (RNTI), or a scrambling code corresponding to a downlink control channel. The retransmission scheduling information is included in the downlink control information. For example, process identifiers of data transmission processes corresponding to the first terminal device are respectively 1, 2, and 3, and four search space set configurations corresponding to the downlink control channels are respectively configurations 1, 2, 3, and 4. Data retransmission scheduling corresponding to the process identifier 1 may be performed by using the retransmission scheduling information that is carried on a downlink control channel received on a physical resource corresponding to the search space set configuration 1. Data retransmission scheduling corresponding to the process identifier 2 is performed by using the retransmission scheduling information that is carried on a downlink control channel received on a physical resource corresponding to the search space set configuration 3. Data retransmission scheduling corresponding to the process identifier 3 is performed by using the retransmission scheduling information that is carried on downlink control channels received on physical resources corresponding to the search space set configurations 2 and 4. In a possible implementation, identifiers of data transmission processes corresponding to the first terminal device are respectively 1 and 2. Radio network temporary identifiers corresponding to the first terminal device include an identifier a and an identifier b. Data retransmission scheduling corresponding to the process identifier 1 is performed by using retransmission scheduling information that is masked by using the identifier a and that is carried on a downlink control channel. Data retransmission scheduling corresponding to the process identifier 2 is performed by using retransmission scheduling information that is masked by using the identifier b and that is carried on a downlink control channel a. In another possible manner, scrambling codes corresponding to the first terminal device include a scrambling code a and a scrambling code b. Data retransmission scheduling corresponding to the process identifier 1 is performed by using the retransmission scheduling information that is scrambled by using the scrambling code a and that is carried on a downlink control channel. Data retransmission scheduling corresponding to the process identifier 2 is performed by using the retransmission scheduling information that is scrambled by using the identifier b and that is carried on a downlink control channel.

Further, if there are M data transmission resources at a window location for sending downlink control information for two consecutive times by the radio access network device, data retransmission is allowed for Z data transmission processes. If Z is less than or equal to M, the retransmission scheduling information indicates the X data transmission processes. Herein, X is equal to Z. In other words, when the retransmission scheduling information indicates the data transmission process of the first terminal device, if a quantity of data transmission resources included in a window is greater than or equal to a quantity of data transmission processes of the first terminal device, one piece of retransmission scheduling information may indicate only Z data transmission processes. A data transmission process may be directly selected according to an order of process identifiers, or may be selected based on a priority of data transmission. A specific implementation is not limited herein. If Z is greater than M, the retransmission scheduling information indicates the X data transmission processes. Herein, X is equal to Z, or X is equal to M. In other words, when the quantity of allowed data transmission processes is greater than the quantity of data transmission resources included in the window, and the retransmission scheduling information indicates the data transmission process of the first terminal device, one piece of retransmission scheduling information may indicate Z data transmission processes, or may indicate the data transmission processes based on the M included data transmission resources. A data transmission process may be directly selected according to an order of process identifiers, or may be selected based on a priority of data transmission. A specific implementation is not limited herein.

In the foregoing several manners, the retransmission scheduling information is configured to include a plurality of pieces of retransmission scheduling information of a terminal device or retransmission scheduling information of a plurality of terminal devices, to effectively reduce downlink overheads.

In this embodiment, if there is a second terminal device, the radio access network device also configures a parameter for the second terminal device. The parameter is used to indicate a data transmission resource of the second terminal device. Therefore, when the retransmission scheduling information includes second retransmission scheduling information of the second terminal device, the second retransmission scheduling information may also be configured by using the same configuration method as the first retransmission scheduling information, and the second retransmission scheduling information is added to the retransmission scheduling information. In this way, the first terminal device may directly read the first retransmission scheduling information to obtain the retransmission resource of the first terminal device, and the second terminal device may directly read the second retransmission scheduling information to obtain the retransmission resource of the second terminal device. In this way, the retransmission resources of the two terminal devices are not limited by each other.

Optionally, in a possible implementation, the radio access network device configures the first parameter for the first terminal device and the second terminal device, and the first parameter is used to determine the data transmission resource of the first terminal device and the data transmission resource of the second terminal device. When the retransmission scheduling information includes the first retransmission scheduling information of the first terminal device and the second retransmission scheduling information of the second terminal device, the radio access network device configures the retransmission scheduling information to include S segments. Each segment includes Q bits. An $i^{th}$ segment of Q bits is used to indicate whether to perform data retransmission for a data transmission process of a terminal device j (that is, each segment of Q bits is used to indicate whether to perform data retransmission for a data transmission process of a terminal device). A retransmission resource of the data transmission process of the terminal device j is determined based on retransmission scheduling information indicated by using a first segment to an $(i-1)^{th}$ segment of Q bits. A value of S is equal to a quantity of data transmission resources indicated by using the first parameter. Herein, S is a positive integer. The retransmission scheduling information indicates a data transmission process of a terminal device. Herein, i is not greater than S, j is not greater than S, and i and j are positive integers. In an example solution, when a value of j is 1, the terminal device 1 is equivalent to the first terminal device in this embodiment; or when a value of j is 2, the terminal device 2 is equivalent to the second terminal device in this embodiment. Optionally, the radio access network device sorts the S segments of Q bits based on values of identifiers of different corresponding terminal devices and different process identifiers. For a terminal device, corresponding Q bits may be learned based on a sorting location at which the terminal device is located. For ease of understanding, it is assumed herein that the retransmission scheduling information includes four segments, each segment is two bits, a terminal device 1 has only two data transmission processes, a terminal device 2 has only one data transmission process, a terminal device 3 has only one data transmission process, and identifiers of the three terminal devices are in ascending order. In this case, a first segment of two bits corresponds to a first data transmission process of the terminal device 1, a second segment of two bits corresponds to a second data transmission process of the terminal device 1, a third segment of two bits corresponds to a data transmission process of the terminal device 2, and a fourth segment of two bits corresponds to a data transmission process of the terminal device 3. The terminal device 1 may learn, based on the first segment of two bits and the second segment of two bits in the retransmission scheduling information, whether to perform data retransmission for the two data transmission processes of the terminal device 1. The terminal device 2 learns, based on the third segment of two bits, whether to perform data retransmission for the data transmission process of the terminal device 2. The terminal device 3 learns, based on the fourth segment of two bits, whether to perform data retransmission for the data transmission process of the terminal device 3.

Specifically, a configuration manner of the retransmission scheduling information may be as follows:

In an example, if Q is equal to 1, the retransmission scheduling information uses the $i^{th}$ segment of Q bits to indicate whether to perform data retransmission for the data transmission process of the terminal device j; or if Q is greater than 1, the retransmission scheduling information uses Q−1 bits in the $i^{th}$ segment of Q bits to indicate a process identifier of the data transmission process corresponding to the terminal device j, and uses one bit in the $i^{th}$ segment of Q bits to indicate whether to perform data retransmission for the data transmission process corresponding to the terminal device j.

Based on the foregoing method, if the terminal device j has P data transmission processes, the S segments of the retransmission scheduling information include R segments of Q bits. Herein, R is not greater than S, R is a positive integer, and P is a positive integer. If R is equal to 1, the retransmission scheduling information indicates a data transmission process corresponding to the terminal device j. In this case, when Q is equal to 1, another configuration parameter is used to indicate a process identifier corresponding to the data transmission process. When Q is greater than 1, Q−1 bits may be used to indicate a process identifier of the data transmission process corresponding to the segment of Q bits. Alternatively, if R is greater than 1 and less than P, each segment of Q bits in the R segments of Q bits indicated by using the retransmission scheduling information indicates one data transmission process corresponding to the terminal device j, that is, the R segments of Q bits in the retransmission scheduling information indicate R data transmission processes of the terminal device j. In this case, when Q is equal to 1, another configuration parameter is used to indicate a correspondence between each segment of Q bits in the R segments of Q bits and a data transmission process identifier of the terminal device j. For example, in the R segments of Q bits, a first segment of Q bit indicates a data transmission process 1 of the terminal device j, and a second segment of Q bit indicates a data transmission process 3 of the terminal device j. When Q is greater than 1, Q–1 bits in each segment in the R segments may be used to indicate a process identifier of a data transmission process corresponding to this segment of Q bits. Alternatively, if R is equal to P, the R segments of Q bits in the retransmission scheduling information are sorted in order based on process identifiers of the data transmission processes corresponding to the first terminal device. In other words, the current retransmission scheduling information indicates all the data transmission processes corresponding to the terminal device j. In this case, when Q is equal to 1, segments of Q bits are sorted in order based on the process identifiers of the data transmission processes corresponding to the first terminal device. For example, if the process identifiers of the data transmission processes corresponding to the terminal device j are 1, 2, 3, and 4, a first segment of Q bits corresponds to a data transmission process of the process identifier 1, a second segment of Q bits corresponds to a data transmission process of the process identifier 2, a third segment of Q bits corresponds to a data transmission process of the process identifier 3, and a fourth segment of Q bits corresponds to a data transmission process of the process identifier 4. When Q is greater than 1, Q–1 bits in each segment in the R segments may be used to indicate a process identifier of a data transmission process corresponding to this segment of Q bits.

804. The first terminal device determines a retransmission resource based on the retransmission scheduling information, the location indication information, and the first parameter.

Figure 10:
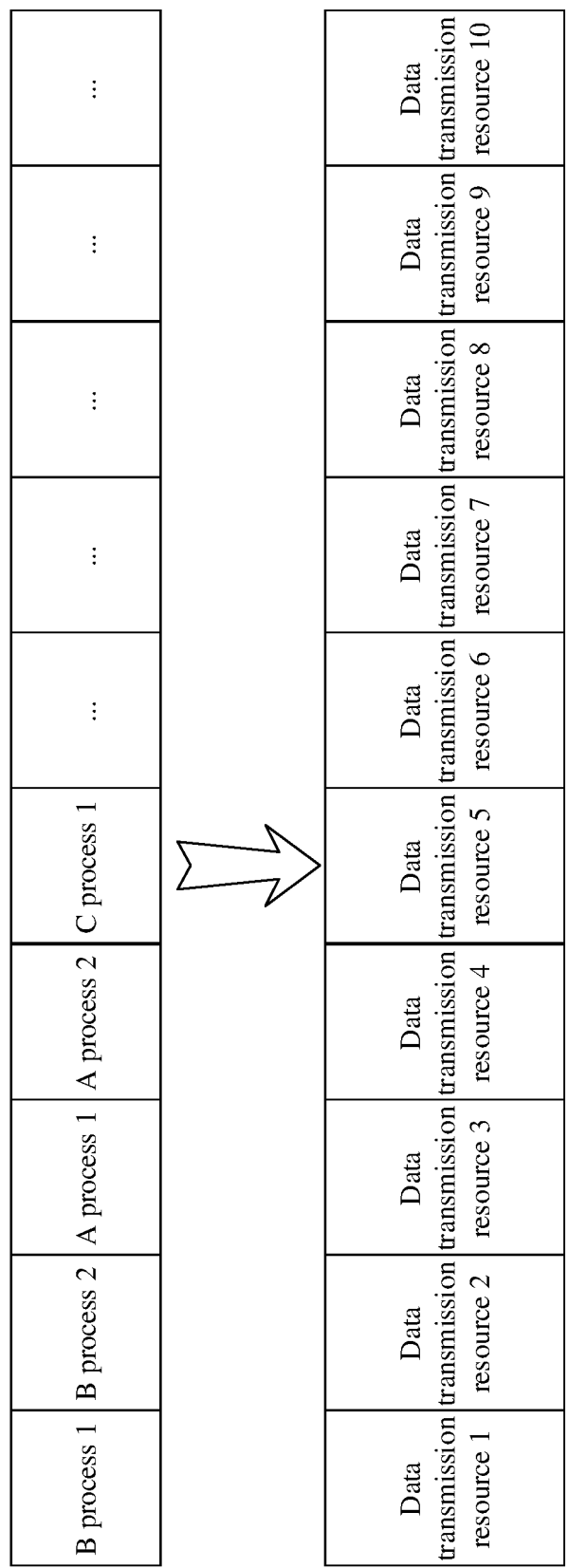
FIG. 10 is another schematic diagram of a structure of retransmission scheduling information for indicating a retransmission resource according to an embodiment of this application.

After the first terminal device receives the retransmission scheduling information, a manner of obtaining the retransmission resource may have the following several possible implementations:

In a possible implementation, the first terminal device determines the first retransmission scheduling information in the retransmission scheduling information based on the location indication information; and then, the first terminal device determines the retransmission resource based on the first retransmission scheduling information and the first parameter. For example, the retransmission resource of the first terminal device in the first data transmission process is a data transmission resource with a configuration identifier of 1. The location indication information obtained by the first terminal device indicates that the first retransmission scheduling information corresponding to the first terminal device is located in a third segment of the retransmission scheduling information sent by the radio access network device. The first terminal device reads the retransmission scheduling information corresponding to the first terminal device from the third segment, and then obtains, based on indication information "retransmission is required, and a retransmission resource is a data transmission resource with a configuration identifier of 1" in the retransmission scheduling information, a related parameter of the data transmission resource with the configuration identifier of 1 from the first parameter. In another possible implementation, the first terminal device determines the first retransmission scheduling information in the retransmission scheduling information based on the location indication information; and determines, based on the first retransmission scheduling information, whether to perform data retransmission for each data transmission process of the first terminal device. Finally, the first terminal device reads the second retransmission scheduling information and the first parameter and determines a retransmission resource of each data transmission process of the first terminal device. For example, as shown in FIG. 10, the retransmission scheduling information is divided into 10 segments. In this case, a first segment corresponds to a data transmission resource whose configuration identifier is 1 and that is determined by using the first parameter, a second segment corresponds to a data transmission resource whose configuration identifier is 2 and that is determined by using the first parameter, and so on. A first data transmission process of the first terminal device (referred to as an A process 1 in FIG. 10) is located in a third segment of the retransmission scheduling information sent by the radio access network device, and a second data transmission process of the first terminal device (referred to as an A process 2 in FIG. 10) is located in a fourth segment of the radio access network device. A first data transmission process of the second terminal device (referred to as a B process 1 in FIG. 10) is located in a first segment of the retransmission scheduling information sent by the radio access network device, and a second data transmission process of the second terminal device (referred to as a B process 2 in FIG. 10) is located in a second segment of the retransmission scheduling information sent by the radio access network device. Information in the first segment indicates "performing retransmission for the B process 1". Information in the second segment indicates "skipping retransmission for the B process 2". Information in the third segment indicates "performing retransmission for the A process 1". Information in the fourth segment indicates "skipping retransmission for the A process 2". In this case, data retransmission is performed for the first data transmission process of the second terminal device by using the data transmission resource whose configuration identifier is 1, and data retransmission is performed for the first data transmission process of the first terminal device by using the data transmission resource whose configuration identifier is 2. If the retransmission scheduling information further includes retransmission scheduling information of a third terminal device, a first data transmission process of the third terminal device is located in a fifth segment of the retransmission scheduling information. If information in the fifth segment indicates "performing retransmission for a C process 1", data retransmission is performed for the first data transmission process of the third terminal device by using a data transmission resource whose configuration identifier is 3. In this embodiment, a total quantity of data transmission processes of each terminal device does not exceed a quantity of data transmission resources indicated by using the first parameter.

805. The first terminal device retransmits the uplink data by using the retransmission resource.

After obtaining the retransmission resource, the first terminal device retransmits the uplink data by using the retransmission resource.

In this embodiment, the radio access network device preconfigures a plurality of data transmission resources for the first terminal device. The first retransmission scheduling information that is configured by the radio access network device for the first terminal device is included in the retransmission scheduling information. Retransmission scheduling information of another terminal device may be further configured in the retransmission scheduling information. In this way, the radio access network device can schedule a plurality of terminal devices through sending the retransmission scheduling information for one time, to reduce downlink control overheads of retransmission scheduling.

The foregoing describes the data retransmission method in this embodiment of this application. The following describes a terminal device in the embodiments of this application.

Figure 11:
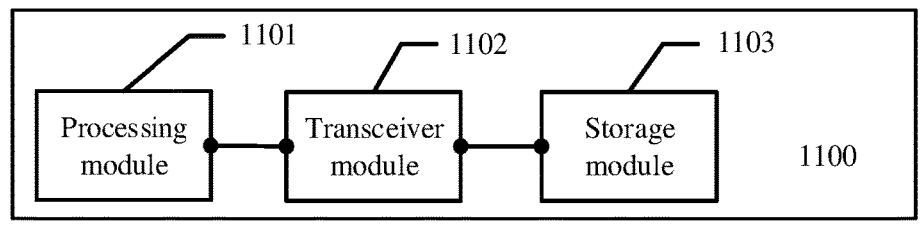
FIG. 11 is a schematic diagram of an embodiment of a terminal device according to an embodiment of this application.

For details, refer to FIG. 11. In this embodiment of this application, a terminal device 1100 includes a processing module 1101 and a transceiver module 1102. The apparatus 1100 may be the first terminal device in the foregoing method embodiment, or may be one or more chips in the first terminal device. The apparatus 1100 may be configured to implement some or all functions of the first terminal device in the foregoing method embodiment.

For example, the transceiver module 1102 may perform step 802 and step 805 in the method embodiment, and perform the step of receiving information in step 803 and step 801. For example, the transceiver module 1102 obtains a first parameter and location indication information that are configured by a radio access network device, where the first parameter is used to determine a data transmission resource of the first terminal device, and the location indication information is used to indicate a location of first retransmission scheduling information corresponding to the first terminal device in retransmission scheduling information; and sends uplink data to the radio access network device, and receives the retransmission scheduling information sent by the radio access network device. The processing module 1101 may be configured to perform step 804 in the foregoing method embodiment. For example, the processing module 1101 determines a retransmission resource based on the retransmission scheduling information, the location indication information, and the first parameter.

The transceiver module 1102 retransmits the uplink data to the radio access network device by using the retransmission resource.

Optionally, the apparatus 1100 further includes a storage module 1103. The storage module 1103 is coupled to the processing module 1101, so that the processing module 1101 can execute computer execution instructions stored in the storage module to implement a function of the first terminal device in the foregoing method embodiment. In an example, the storage module optionally included in the apparatus 1100 may be a storage unit in a chip, for example, a register or a cache. The storage module may alternatively be a storage unit that is located outside the chip, for example, a read-only memory (ROM), another type of static storage device that can store static information and instructions, or a random access memory (RAM).

It should be understood that a procedure executed by each module of the terminal device in the embodiment corresponding to FIG. 11 is similar to the procedure executed by the first terminal device in the method embodiment corresponding to FIG. 8. Details are not described herein again.

Figure 12:
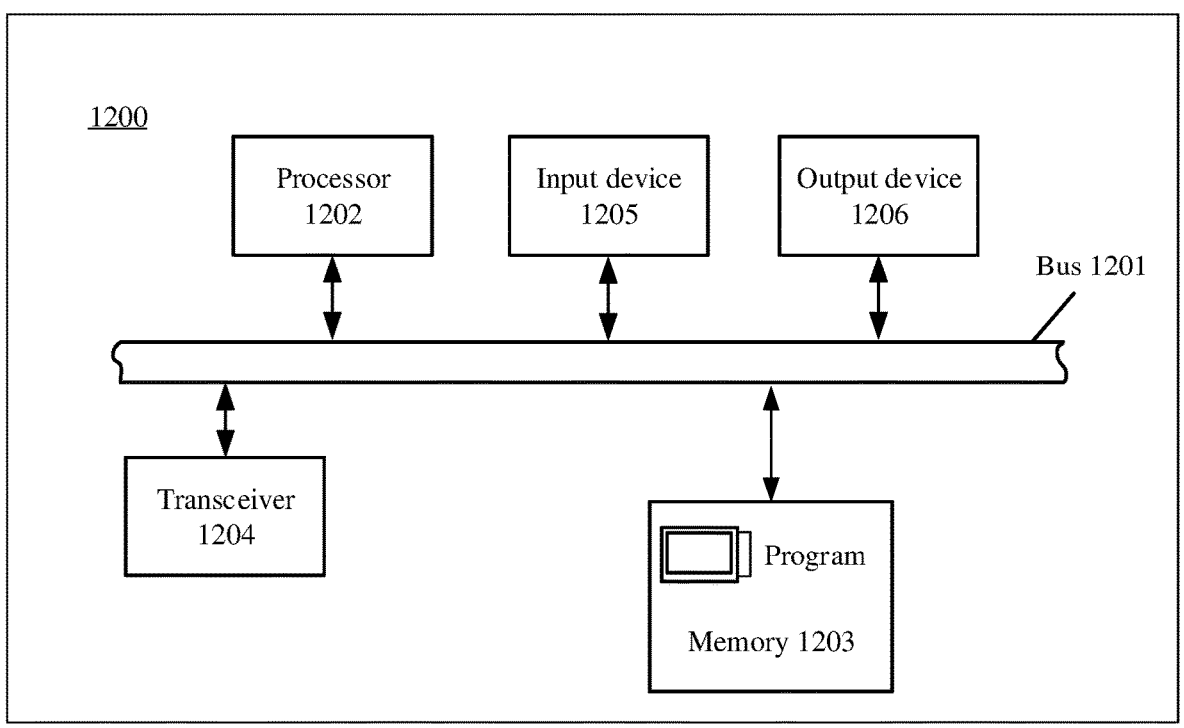
FIG. 12 is a schematic diagram of another embodiment of a terminal device according to an embodiment of this application.

FIG. 12 is a schematic diagram of a possible structure of a terminal device 1200 in the foregoing embodiment. The apparatus 1200 may be configured as the foregoing first terminal device. The apparatus 1200 may include a processor 1202, a computer readable storage medium/memory 1203, a transceiver 1204, an input device 1205, an output device 1206, and a bus 1201. The processor, the transceiver, the computer-readable storage medium, and the like are connected through the bus. A specific connection medium between the foregoing components is not limited in this embodiment of this application.

For example, the transceiver 1204 obtains a first parameter and location indication information that are configured by a radio access network device, where the first parameter is used to determine a data transmission resource of the first terminal device, and the location indication information is used to indicate a location of first retransmission scheduling information corresponding to the first terminal device in retransmission scheduling information; and sends uplink data to the radio access network device, and receives the retransmission scheduling information sent by the radio access network device.

The processor 1202 determines a retransmission resource based on the retransmission scheduling information, the location indication information, and the first parameter.

The transceiver 1204 retransmits the uplink data to the radio access network device by using the retransmission resource.

In an example, the processor 1202 may include a baseband circuit. For example, the processor 1202 may perform data encapsulation, coding, and the like on the uplink data or the retransmitted data according to a protocol, to generate a data packet. The transceiver 1204 may include a radio frequency circuit, to perform processing such as modulation and amplification on the data packet and then send the processed data packet to the radio access network device.

In another example, the processor 1202 may run an operating system to control a function between each device and each component. The transceiver 1204 may include a baseband circuit and a radio frequency circuit. For example, the data packet may be processed by using the baseband circuit and the radio frequency circuit, and then the processed data packet is sent to the radio access network device.

The transceiver 1204 and the processor 1202 may implement corresponding steps in any embodiment in FIG. 8. Details are not described herein again.

It may be understood that FIG. 12 shows merely a simplified design of the terminal device. In actual application, the terminal device may include any quantity of transceivers, processors, memories, and the like. All terminal devices that can implement this application fall within the protection scope of this application.

The processor 1202 in the apparatus 1200 may be a general-purpose processor, for example, a general-purpose central processing unit (CPU), a network processor (NP), or a microprocessor, or may be an application-specific integrated circuit (ASIC), or one or more integrated circuits configured to control program execution in the solutions of this application. Alternatively, the processor 1202 may be a digital signal processor (DSP), a field-programmable gate array (FPGA), another programmable logic device, a discrete gate, a transistor logic device, or a discrete hardware component. Alternatively, a controller/processor may be a combination of processors implementing a computing function, for example, a combination of one or more microprocessors, or a combination of the DSP and the microprocessor. The processor usually performs logical and arithmetic operations according to program instructions stored in the memory.

The bus 1201 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 12, but this does not mean that there is only one bus or only one type of bus.

The computer-readable storage medium/memory 1203 may further store an operating system and another application program. Specifically, the program may include program code, and the program code includes computer operation instructions. More specifically, the memory may be a read-only memory (ROM), another type of static storage device that can store static information and instructions, a random access memory (RAM), another type of dynamic storage device that can store information and instructions, a magnetic disk memory, or the like. The memory 1203 may be a combination of the foregoing memories. In addition, the computer-readable storage medium/memory may be located in the processor, or may be located outside the processor, or distributed in a plurality of entities including the processor or a processing circuit. The computer-readable storage medium/memory may be specifically embodied in a computer program product. For example, the computer program product may include a computer-readable medium in a packaging material.

Alternatively, an embodiment of this application further provides a universal processing system. For example, the universal processing system is usually referred to as a chip. The universal processing system includes one or more microprocessors that provide a processor function and an external memory that provides at least a part of a storage medium. All these components are connected to other supporting circuits by using external bus architecture. When the instructions stored in the memory are executed by the processor, the processor is enabled to perform some or all of the steps of the terminal device in the data retransmission method in the embodiment shown in FIG. 8, for example, step 804 in FIG. 8 and/or another process of the technology described in this application.

Method or algorithm steps described in combination with the content disclosed in this application may be implemented by hardware, or may be implemented by a processor by executing software instructions. The software instructions may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in the terminal device. Certainly, the processor and the storage medium may exist in the terminal device as separate components.

Figure 13:
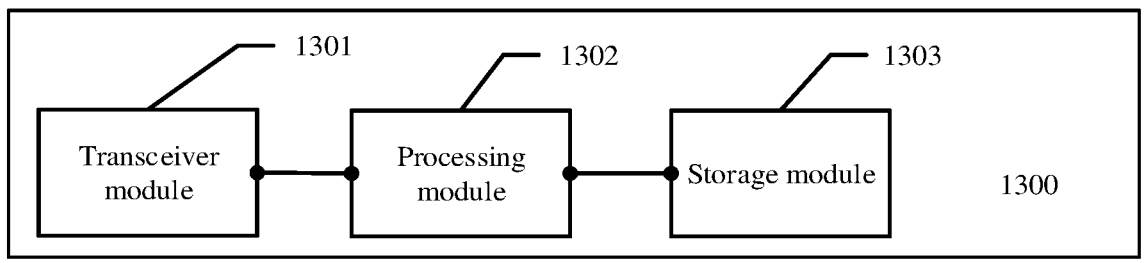
FIG. 13 is a schematic diagram of an embodiment of a radio access network device according to an embodiment of this application.

For details, refer to FIG. 13. In this embodiment of this application, a radio access network device 1300 includes a transceiver module 1301 and a processing module 1302. The apparatus 1300 may be the radio access network device in the foregoing method embodiment, or may be one or more chips in the radio access network device. The apparatus 1300 may be configured to implement some or all functions of the radio access network device in the foregoing method embodiment.

For example, the processing module 1302 may be configured to perform step 801 in the foregoing method embodiment. The processing module 1302 configures a first parameter and location indication information for a first terminal device. The first parameter is used to determine a data transmission resource of the first terminal device. The location indication information is used to indicate a location of first retransmission scheduling information corresponding to the first terminal device in retransmission scheduling information. The transceiver module 1301 may be configured to perform step 803 in the foregoing method embodiment. For example, the transceiver module 1301 is configured to: receive uplink data sent by the first terminal device, and send the retransmission scheduling information to the first terminal device; and receive the uplink data retransmitted by the first terminal device.

Optionally, the apparatus 1300 further includes a storage module 1303. The storage module 1303 is coupled to the processing module, so that the processing module can execute computer executable instructions stored in the storage module to implement a function of the radio access network device in the foregoing method embodiment. In an example, the storage module optionally included in the apparatus 1300 may be a storage unit in a chip, for example, a register or a cache. Alternatively, the storage module may be a storage unit located outside the chip, for example, a read-only memory (ROM), another type of static storage device that can store static information and instructions, a random access memory (RAM), or the like.

It should be understood that a procedure executed by each module of the radio access network device in the embodiment corresponding to FIG. 13 is similar to the procedure executed by the radio access network device in the method embodiment corresponding to FIG. 8. Details are not described herein again.

Figure 14:
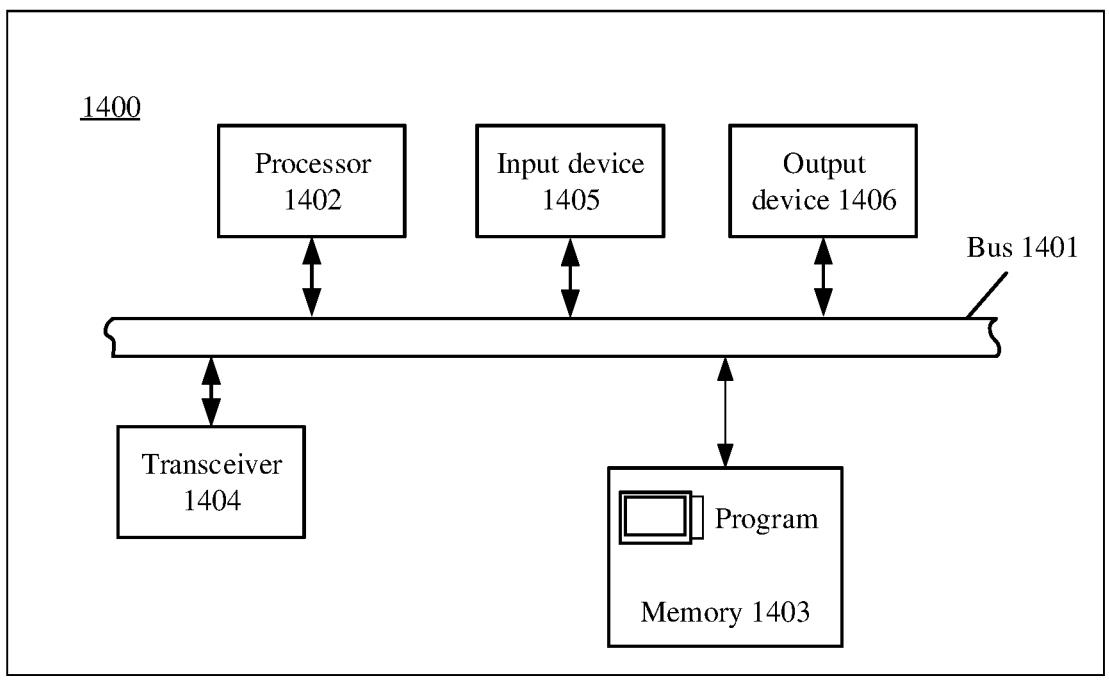
FIG. 14 is a schematic diagram of another embodiment of a radio access network device according to an embodiment of this application.

FIG. 14 is a schematic diagram of a possible structure of a radio access network device 1400 in the foregoing embodiment. The apparatus 1400 may be configured as the foregoing radio access network device. The apparatus 1400 may include a processor 1402, a computer-readable storage medium/memory 1403, a transceiver 1404, an input device 1405, an output device 1406, and a bus 1401. The processor, the transceiver, the computer-readable storage medium, and the like are connected through the bus. A specific connection medium between the foregoing components is not limited in this embodiment of this application.

In an example, the processor 1402 may be configured to configure a first parameter and location indication information for a first terminal device. The first parameter is used to determine a data transmission resource of the first terminal device. The location indication information is used to indicate a location of first retransmission scheduling information corresponding to the first terminal device in retransmission scheduling information.

The transceiver 1401 receives uplink data sent by the first terminal device, and sends the retransmission scheduling information to the first terminal device; and receives the uplink data retransmitted by the first terminal device.

In an example, the processor 1402 may include a baseband circuit. For example, the processor 1402 may perform data encapsulation, coding, and the like on the first parameter and the location indication information according to a protocol, to generate a data packet. The transceiver 1404 may include a radio frequency circuit, to perform processing such as modulation and amplification on the data packet and then send the processed data packet to the terminal device.

In another example, the processor 1402 may run an operating system to control a function between each device and each component. The transceiver 1404 may include a baseband circuit and a radio frequency circuit. For example, the data packet may be processed by using the baseband circuit and the radio frequency circuit, and then the processed data packet is sent to the terminal device.

In addition, the transceiver 1401 and the processor 1402 may further implement corresponding steps in any embodiment in FIG. 8. For specific implementations, details are not described herein again.

It may be understood that FIG. 14 shows merely a simplified design of the radio access network device. In actual application, the radio access network device may include any quantity of transceivers, processors, memories, and the like. All radio access network devices that can implement this application fall within the protection scope of this application.

The processor 1402 in the apparatus 1400 may be a general-purpose processor, for example, a general-purpose central processing unit (CPU), a network processor (NP), a microprocessor, an application-specific integrated circuit (ASIC), or one or more integrated circuits configured to control program execution in the solutions of this application. Alternatively, the processor 1402 may be a digital signal processor (DSP), a field-programmable gate array (FPGA), another programmable logic device, a discrete gate, a transistor logic device, or a discrete hardware component. Alternatively, a controller/processor may be a combination of processors implementing a computing function, for example, a combination of one or more microprocessors, or a combination of the DSP and the microprocessor. The processor usually performs logical and arithmetic operations according to program instructions stored in the memory.

The bus 1401 mentioned above may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 14, but this does not mean that there is only one bus or only one type of bus.

The computer-readable storage medium/memory 1403 may further store an operating system and another application program. Specifically, the program may include program code, and the program code includes computer operation instructions. More specifically, the memory may be a read-only memory (ROM), another type of static storage device that can store static information and instructions, a random access memory (RAM), another type of dynamic storage device that can store information and instructions, a magnetic disk memory, or the like. The memory 1403 may be a combination of the foregoing storage types. In addition, the computer-readable storage medium/memory may be located in the processor, or may be located outside the processor, or distributed in a plurality of entities including the processor or a processing circuit. The computer-readable storage medium/memory may be specifically embodied in a computer program product. For example, the computer program product may include a computer-readable medium in a packaging material.

Alternatively, an embodiment of this application further provides a universal processing system. For example, the universal processing system is usually referred to as a chip. The universal processing system includes one or more microprocessors that provide a processor function and an external memory that provides at least a part of a storage medium. All these components are connected to other supporting circuits by using external bus architecture. When the instructions stored in the memory are executed by the processor, the processor is enabled to perform some or all of the steps of the radio access network device in the data retransmission method in the embodiment shown in FIG. 8, for example, the step of sending the first parameter and the location indication information in FIG. 8, the step of receiving the retransmitted data in step 805 in FIG. 8, and/or another process of the technology described in this application.

Method or algorithm steps described in combination with the content disclosed in this application may be implemented by hardware, or may be implemented by a processor by executing software instructions. The software instructions may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. Additionally, the ASIC may be located in a radio access network device. Certainly, the processor and the storage medium may exist in the device as discrete components.

Figure 15:
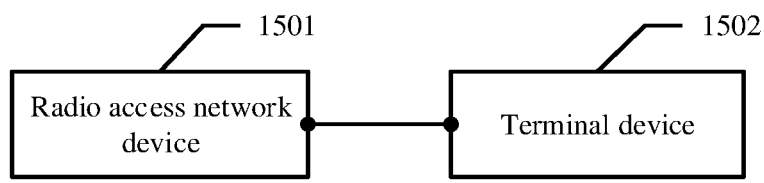
FIG. 15 is a schematic diagram of an embodiment of a data retransmission system according to an embodiment of this application.

For details, refer to FIG. 15. An embodiment of a data retransmission system in the embodiments of this application includes: a radio access network device 1501 and a terminal device 1502.

Data transmission is implemented between the radio access network device 1501 and the terminal device 1502 by using a network system.

The radio access network device 1501 has all functions of the radio access network device in FIG. 8, and the terminal device 1502 has all functions of the terminal device in FIG. 8.

It may be clearly understood by persons skilled in the art that, for the purpose of convenient and brief description, for a detailed working process of the foregoing system, apparatus, and unit, reference may be made to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method, comprising:
    obtaining, by a first terminal device, a first parameter and location indication information that are configured by a radio access network device, wherein the first parameter is configured to be used to determine a data transmission resource of the first terminal device, and the location indication information indicates a location of first retransmission scheduling information corresponding to the first terminal device in retransmission scheduling information;
    sending, by the first terminal device, uplink data to the radio access network device, and receiving the retransmission scheduling information sent by the radio access network device;
    determining, by the first terminal device, a retransmission resource based on the retransmission scheduling information, the location indication information, and the first parameter; and
    retransmitting, by the first terminal device, the uplink data to the radio access network device by using the retransmission resource.

2. The method according to claim 1, wherein the retransmission scheduling information comprises N bits indicating a retransmission resource of a first data transmission process corresponding to the first terminal device, N is a positive integer, the retransmission scheduling information further indicates the first data transmission process of the first terminal device, and the retransmission resource is comprised in the data transmission resource indicated by the first parameter.

3. The method according to claim 2, wherein the retransmission scheduling information indicating the first data transmission process of the first terminal device comprises:
    the first terminal device corresponds to X data transmission processes, and the retransmission scheduling information comprises X groups of N bits indicating retransmission resources corresponding to the X data transmission processes of the first terminal device, wherein the X groups of N bits are sorted in order based on process identifiers of the X data transmission processes, and X is a positive integer.

4. The method according to claim 2, wherein the retransmission scheduling information indicating the first data transmission process of the first terminal device comprises:
    the first terminal device corresponds to X data transmission processes, the retransmission scheduling information comprises Y bits indicating a process identifier of the first data transmission process corresponding to the first terminal device, and the retransmission scheduling information further comprises N bits indicating a retransmission resource of the first data transmission process corresponding to the first terminal device.

5. The method according to claim 2, wherein the retransmission scheduling information indicating the first data transmission process of the first terminal device comprises:
    the retransmission scheduling information is comprised in downlink control information, and a parameter of the downlink control information indicates a process identifier of the first data transmission process corresponding to the first terminal device, wherein the parameter of the downlink control information is a search space configuration, a radio network temporary identifier, or a scrambling code corresponding to a downlink control channel.

6. The method according to claim 2, wherein determining, by the first terminal device, the retransmission resource based on the retransmission scheduling information, the location indication information, and the first parameter comprises:
    determining, by the first terminal device, the first retransmission scheduling information in the retransmission scheduling information based on the location indication information; and
    determining, by the first terminal device, the retransmission resource based on the first retransmission scheduling information and the first parameter.

7. The method according to claim 1, wherein the retransmission scheduling information comprises the first retransmission scheduling information of the first terminal device and second retransmission scheduling information of a second terminal device, and the first parameter is configured to be used to determine the data transmission resource of the first terminal device and a data transmission resource of the second terminal device; and
    wherein the retransmission scheduling information comprises S segments, each segment comprises Q bits, an $i^{th}$ segment of each Q bits of each segment indicates whether to perform data retransmission for a data transmission process of a respective terminal device j, and each retransmission resource of the data transmission process corresponding to each respective terminal device j is determined based on retransmission scheduling information indicated by using a first segment to an $(i-1)^{th}$ segment of Q bits, and wherein a value of S is equal to a quantity of data transmission resources indicated by using the first parameter, S is a positive integer, each retransmission scheduling information indicates a data transmission process of a terminal device, i is not greater than S, j is not greater than S, and i and j are positive integers.

8. A first terminal device, comprising:
at least one processor and at least one memory storing instructions, wherein the instructions are executable by the at least one processor to cause the first terminal device perform operations of:
obtaining a first parameter and location indication information that are configured by a radio access network device, wherein the first parameter is configured to be used to determine a data transmission resource of the first terminal device, and the location indication information indicates a location of first retransmission scheduling information corresponding to the first terminal device in retransmission scheduling information;
sending uplink data to the radio access network device, and receiving the retransmission scheduling information sent by the radio access network device;
determining a retransmission resource based on the retransmission scheduling information, the location indication information, and the first parameter; and
retransmitting the uplink data to the radio access network device by using the retransmission resource.

9. The first terminal device according to claim 8, wherein the retransmission scheduling information uses N bits to indicate a retransmission resource of a first data transmission process corresponding to the first terminal device, N is a positive integer, the retransmission scheduling information indicates the first data transmission process of the first terminal device, and the retransmission resource is comprised in the data transmission resource indicated by using the first parameter.

10. The first terminal device according to claim 9, wherein the retransmission scheduling information indicating the first data transmission process of the first terminal device comprises:
the first terminal device corresponds to X data transmission processes, the retransmission scheduling information comprises X groups of N bits indicating retransmission resources corresponding to the X data transmission processes of the first terminal device, wherein the X groups of N bits are sorted in order based on process identifiers of the X data transmission processes, and X is a positive integer.

11. The first terminal device according to claim 9, wherein the retransmission scheduling information indicating the first data transmission process of the first terminal device comprises:
the first terminal device corresponds to X data transmission processes, the retransmission scheduling information comprises Y bits indicating a process identifier of the first data transmission process corresponding to the first terminal device, and the retransmission scheduling information further comprises N bits to indicating a retransmission resource of the first data transmission process corresponding to the first terminal device.

12. The first terminal device according to claim 9, wherein the retransmission scheduling information indicating the first data transmission process of the first terminal device comprises:
the retransmission scheduling information is comprised in downlink control information, and a parameter of the downlink control information indicates a process identifier of the first data transmission process corresponding to the first terminal device, wherein the parameter of the downlink control information is a search space configuration, a radio network temporary identifier, or a scrambling code corresponding to a downlink control channel.

13. The first terminal device according to claim 9, wherein determining the retransmission resource based on the retransmission scheduling information, the location indication information, and the first parameter comprises:
determining the first retransmission scheduling information in the retransmission scheduling information based on the location indication information; and
determining the retransmission resource based on the first retransmission scheduling information and the first parameter.

14. The first terminal device according to claim 8, wherein the retransmission scheduling information comprises the first retransmission scheduling information of the first terminal device and second retransmission scheduling information of a second terminal device, and the first parameter is configured to be used to determine the data transmission resource of the first terminal device and a data transmission resource of the second terminal device; and
wherein the retransmission scheduling information comprises S segments, each segment comprises Q bits, an $i^{th}$ segment of the Q bits of each segment indicates whether to perform data retransmission for a data transmission process of a respective terminal device j, and each retransmission resource of the data transmission process corresponding to each respective terminal device j is determined based on retransmission scheduling information indicated by using a first segment to an $(i-1)^{th}$ segment of Q bits, and wherein a value of S is equal to a quantity of data transmission resources indicated by using the first parameter, S is a positive integer, each retransmission scheduling information indicates a data transmission process of a terminal device, i is not greater than S, j is not greater than S, and i and j are positive integers.

15. A radio access network device, comprising:
at least one processor and at least one memory storing instructions, wherein the instructions are executable by the at least one processor to cause the radio access network device to perform operations of:
configuring a first parameter and location indication information for a first terminal device, wherein the first parameter is configured to be used to determine a data transmission resource of the first terminal device, and the location indication information indicates a location of first retransmission scheduling information corresponding to the first terminal device in retransmission scheduling information;
receiving uplink data sent by the first terminal device, and sending the retransmission scheduling information to the first terminal device; and
receiving the uplink data retransmitted by the first terminal device.

16. The radio access network device according to claim 15, wherein the retransmission scheduling information comprises N bits indicating a retransmission resource of a first data transmission process corresponding to the first terminal device, N is a positive integer, the retransmission scheduling information indicates the first data transmission process of the first terminal device, and the retransmission resource is comprised in the data transmission resource indicated by using the first parameter.

17. The radio access network device according to claim 16, wherein the retransmission scheduling information indicating the data transmission process of the first terminal device comprises:
the first terminal device corresponds to X data transmission processes, the retransmission scheduling information comprises X groups of N bits indicating retransmission resources corresponding to the X data transmission processes of the first terminal device, wherein the X groups of N bits are sorted in order based on process identifiers of the X data transmission processes, and X is a positive integer.

18. The radio access network device according to claim 16, wherein the retransmission scheduling information indicating the first data transmission process of the first terminal device comprises:

the first terminal device corresponds to X data transmission processes, the retransmission scheduling information comprises Y bits indicating a process identifier of the first data transmission process corresponding to the first terminal device, and the retransmission scheduling information comprises N bits indicating the retransmission resource of the first data transmission process corresponding to the first terminal device.

19. The radio access network device according to claim 16, wherein the retransmission scheduling information indicating the first data transmission process of the first terminal device comprises:

the retransmission scheduling information is comprised in downlink control information, a parameter of the downlink control information indicates a process identifier of the first data transmission process corresponding to the first terminal device, and wherein the parameter of the downlink control information is a search space configuration, a radio network temporary identifier, or a scrambling code corresponding to downlink control information.

20. The radio access network device according to claim 15, wherein the retransmission scheduling information comprises the first retransmission scheduling information of the first terminal device and second retransmission scheduling information of a second terminal device, and the first parameter is configured to be used to determine the data transmission resource of the first terminal device and a data transmission resource of the second terminal device; and wherein the retransmission scheduling information is configured as S segments, each segment comprises Q bits, an $i^{th}$ segment of each of the Q bits indicates whether to perform data retransmission for a data transmission process of a respective terminal device j, and each retransmission resource of the data transmission process corresponding to the each respective terminal device j is determined based on retransmission scheduling information indicated by using a first segment to an $(i-1)^{th}$ segment of Q bits, and wherein a value of S is equal to a quantity of data transmission resources indicated by using the first parameter, S is a positive integer, each retransmission scheduling information indicates a data transmission process of a terminal device, i is not greater than S, j is not greater than S, and i and j are positive integers.

* * * * *